United States Patent
Endo et al.

(10) Patent No.: US 9,882,647 B2
(45) Date of Patent: Jan. 30, 2018

(54) OPTICAL TRANSMISSION APPARATUS, OPTICAL TRANSMISSION SYSTEM, AND POLARIZATION DEPENDENT LOSS MONITOR

(71) Applicant: FUJITSU LIMITED, Kawasaki-shi, Kanagawa (JP)

(72) Inventors: Taketo Endo, Kawasaki (JP); Kosuke Komaki, Kawasaki (JP); Taku Saito, Kawasaki (JP); Hirofumi Araki, Kawasaki (JP); Makoto Shimizu, Oyama (JP); Hiroshi Nishida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/013,190

(22) Filed: Feb. 2, 2016

(65) Prior Publication Data

US 2016/0241341 A1    Aug. 18, 2016

(30) Foreign Application Priority Data

Feb. 18, 2015 (JP) .................................. 2015-029919

(51) Int. Cl.
| | |
|---|---|
| H04B 10/08 | (2006.01) |
| H04B 17/00 | (2015.01) |
| H04B 10/06 | (2006.01) |
| H04B 10/50 | (2013.01) |

(Continued)

(52) U.S. Cl.
CPC ......... *H04B 10/50* (2013.01); *H04B 10/0795* (2013.01); *H04L 25/03343* (2013.01)

(58) Field of Classification Search
USPC .......................................... 398/25, 205, 208
See application file for complete search history.

(56) References Cited

U.S. PATENT DOCUMENTS

| | | | | |
|---|---|---|---|---|
| 7,936,999 B1 * | 5/2011 | Hawryluck | ............ | H04B 10/60 398/152 |
| 9,203,558 B1 * | 12/2015 | Dave | .................... | H04L 1/0054 |

(Continued)

FOREIGN PATENT DOCUMENTS

| | | |
|---|---|---|
| AG | 2013-162182 | 8/2013 |
| JP | 2010-80665 | 4/2010 |
| JP | 2012-50140 | 3/2012 |

*Primary Examiner* — David Payne
*Assistant Examiner* — Pranesh Barua
(74) *Attorney, Agent, or Firm* — Staas & Halsey LLP

(57) ABSTRACT

An optical transmission apparatus includes: a coherent detector configured to receive light including different polarization components from an optical transmission path, and perform coherent detection of received light including the different polarization components; an adaptive equalizer configured to adaptively equalize, by a digital filter, a complex electric signal for each of the polarization components obtained by the coherent detection, a gain value for controlling an amplitude of the complex electric signal being applied to the complex electric signal; and a polarization dependent loss monitor configured to determine a polarization dependent loss of the optical transmission path, based on a correction filter parameter obtained by correcting a filter parameter of the digital filter according to the gain value, the filter parameter being adaptively updated by an adaptive equalization of the adaptive equalizer.

8 Claims, 15 Drawing Sheets

(51) Int. Cl.
*H04B 10/079* (2013.01)
*H04L 25/03* (2006.01)

(56) References Cited

U.S. PATENT DOCUMENTS

| | | | | |
|---|---|---|---|---|
| 2004/0001541 A1* | 1/2004 | Haghighat | ........ | H04L 25/03019 375/232 |
| 2004/0105682 A1* | 6/2004 | Roberts | ........... | H04B 10/25137 398/147 |
| 2010/0189445 A1* | 7/2010 | Nakashima | ............ | H04B 10/60 398/152 |
| 2011/0103795 A1* | 5/2011 | Khandani | ............ | H04B 10/60 398/65 |
| 2011/0142456 A1* | 6/2011 | Takahashi | ............ | H04B 10/296 398/152 |
| 2011/0150506 A1* | 6/2011 | Tanimura | ............. | H04B 10/697 398/208 |
| 2012/0002979 A1* | 1/2012 | Xie | ...................... | H04B 10/611 398/208 |
| 2012/0128351 A1* | 5/2012 | Yuki | .................. | H04B 10/0775 398/38 |
| 2012/0128377 A1* | 5/2012 | Hatae | .................. | H04B 10/616 398/208 |
| 2012/0170929 A1* | 7/2012 | Xie | .................... | H04B 10/0793 398/33 |
| 2012/0281988 A1* | 11/2012 | Kikuchi | ............. | H04B 10/5561 398/159 |
| 2012/0308227 A1* | 12/2012 | Komaki | ........... | H04B 10/25073 398/25 |
| 2013/0243420 A1* | 9/2013 | Li | ...................... | H04B 10/6162 398/25 |
| 2015/0333838 A1* | 11/2015 | Horikoshi | ............. | H04L 27/066 398/208 |

* cited by examiner

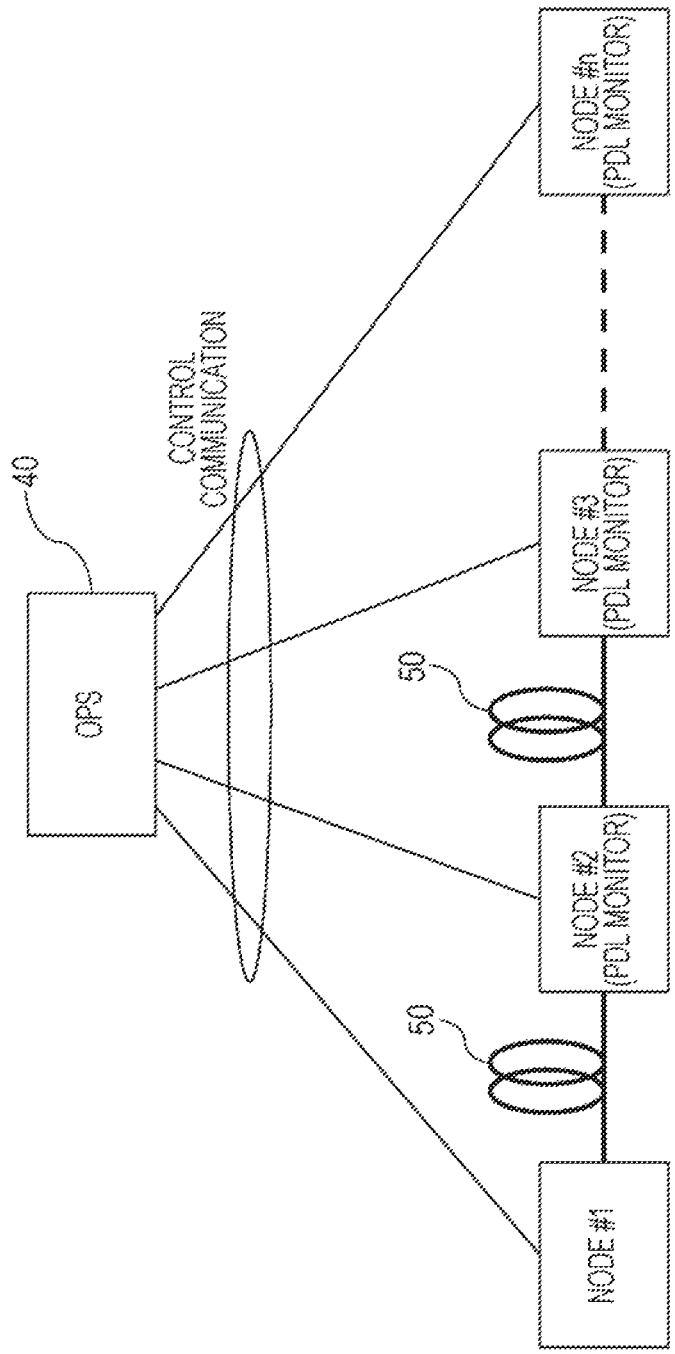

OPTICAL TRANSMISSION APPARATUS, OPTICAL TRANSMISSION SYSTEM, AND POLARIZATION DEPENDENT LOSS MONITOR

CROSS-REFERENCE TO RELATED APPLICATION

This application is based upon and claims the benefit of priority of the prior Japanese Patent Application No. 2015-029919, filed on Feb. 18, 2015, the entire contents of which are incorporated herein by reference.

FIELD

The embodiment discussed herein is related to an optical transmission apparatus, an optical transmission system, and a polarization dependent loss monitor.

BACKGROUND

Due to increasing communication traffics in the optical network, improvement of transmission performance (for example, transmission distance and transmission capacity) of the optical transmission system is expected. A wavelength division multiplexing (WDM) transmission technique is known as one of techniques for improving the transmission performance.

In order to further improve the transmission performance, the recent WDM transmission technique has been studied, for example, for improvement of frequency utilization efficiency in the transmission band by narrowing the wavelength arrangement spacing, and achievement of higher transmission bit rate per wavelength (or may be referred to as a "channel"), as well as increase of the number of wavelengths multiplexed.

For example, the digital coherent transmission technique is considered to be a prospective one of the techniques for improving transmission performance of the optical transmission system. In the digital coherent transmission technique, the received light is subjected to coherent detection by the optical receiver, and a signal subjected to digital sampling is demodulated by digital signal processing.

As examples of the prior art, Japanese Laid-open Patent Publication Nos. 2013-162182, 2010-080665, and 2012-050140 are known.

SUMMARY

According to an aspect of the invention, an optical transmission apparatus includes: a coherent detector configured to receive light including different polarization components from an optical transmission path, and perform coherent detection of received light including the different polarization components; an adaptive equalizer configured to adaptively equalize, by a digital filter, a complex electric signal for each of the polarization components obtained by the coherent detection, a gain value for controlling an amplitude of the complex electric signal being applied to the complex electric signal; and a polarization dependent loss monitor configured to determine a polarization dependent loss of the optical transmission path, based on a correction filter parameter obtained by correcting a filter parameter of the digital filter according to the gain value, the filter parameter being adaptively updated by an adaptive equalization of the adaptive equalizer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3 and 6 is subjected to automatic gain control (AGC);

FIG. 15 is a block diagram illustrating a configuration example of an optical transmission system provided with any one of the nodes of the first to third embodiments.

DESCRIPTION OF EMBODIMENTS

Figure 1:
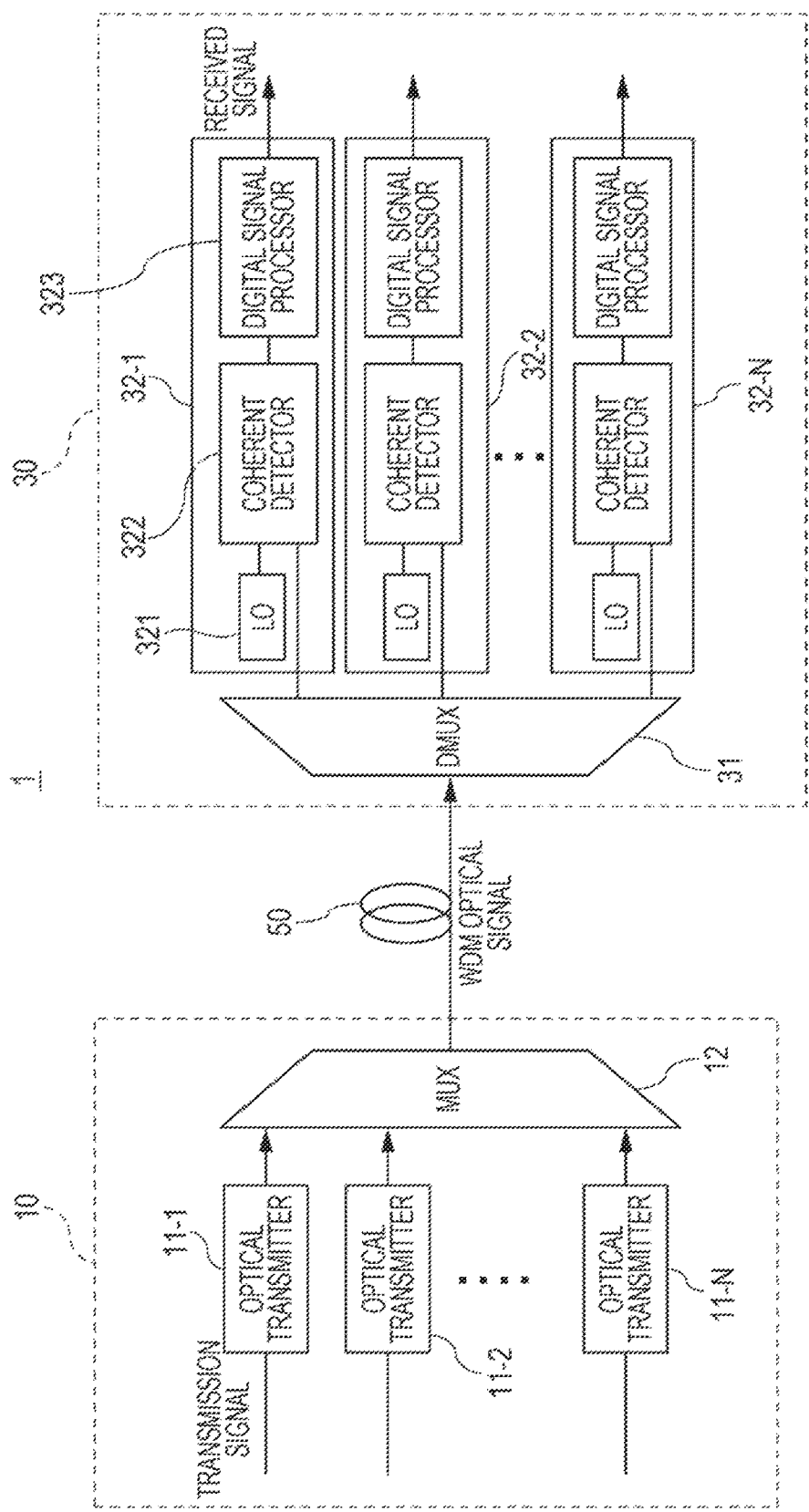
FIG. 1 is a block diagram illustrating a configuration example of an optical transmission system.

In the optical transmission system, transmission characteristics (or signal quality) of the signal light transmitted in the optical transmission path may deteriorate due to an optical loss by the optical transmission path. Deterioration of transmission characteristics leads to restriction of transmission performance of the optical transmission system.

One of the optical losses of the signal light caused by the optical transmission path is polarization dependent loss (PDL). If the PDL of the optical transmission path could be measured (or monitored) at a high precision, the measured high-precision PDL value may be made available, for example, for improvement of the transmission performance of the optical transmission system.

Hereinafter, an embodiment of a technique for enhancing the measurement precision of the polarization dependent loss is described with reference to the accompanying drawings. However, the embodiment described below is merely illustrative, and not intended to exclude various modifications and techniques not specified below. Various illustrative modes described below may be embodied in combination with one another as appropriate. Throughout the drawings used for the following embodiment, a portion assigned with the same reference numeral represents the same or similar component, unless otherwise indicated.

FIG. 1 is a block diagram illustrating a configuration example of an optical transmission system. The optical transmission system (or "optical network") 1 illustrated in FIG. 1 may comprise, by way of example, an optical transmission node 10 and an optical reception node 30.

Each of the optical transmission node 10 and the optical reception node 30 is one example of the optical transmission device and may be referred to as a network element (NE). "Node" may be referred to as "station".

The optical transmission path 10 may be connected to the optical reception node 30 via the optical transmission path 50 in a manner allowing mutual optical communication. Optical fiber may be applied to the optical transmission path 50.

The optical transmission node 10 is, by way of example, capable of transmitting a WDM signal light of the multi-wavelength light subjected to the wavelength division multiplexing (WDM) to the optical transmission path 50. The optical reception node 30 is capable of receiving the WDM signal light from the optical transmission path 50.

For this reason, the optical transmission node 10 may comprise, by way of example, multiple optical transmitters 11-1 to 11-N(N is an integer equal to or larger than 2) and a wavelength multiplexer 12. The optical reception node 30 may comprise a wavelength demultiplexer 31 and multiple optical receivers 32-1 to 32-N.

The optical transmitter 11-$i$ (i is any of 1 to N) may be referred to as "optical transmitter 11" when each transmitter does not have to be distinguished. Similarly, the optical receiver 32-$i$ may be referred to as "optical receiver 32" when each receiver does not have to be distinguished. In the example of FIG. 1, the number (N) of the optical transmitters 11 and the number (N) of the optical receivers 32 are the same, but they may be different.

The optical transmitter 11 may comprise a light source and an optical modulator (not illustrated) configured to modulate output light of the light source with a drive signal according to the transmission data signal and thereby generate a transmission modulation signal.

A semiconductor laser diode (LD) may be applied to the light source. LD may have a fixed emission wavelength, or may be a tunable LD having a variable emission wavelength. In the example of FIG. 1, emission wavelengths of the light source in respective optical transmitters 11-$i$ may be different from one another. The optical transmitter 11 may be referred to as "transmission light source", and "emission wavelength" of "transmission light source" may be referred to as "transmission wavelength".

By way of example, a mach-zehnder (MZ) optical modulator may be applied to the optical modulator. Multi-level phase shift keying (PSK), multi-level quadrature amplitude modulation (QAM), and so on may be applied to an optical modulation system used in the optical modulator.

The optical modulation system may be combined with a multiplexing system such as polarization multiplexing for one wavelength, and orthogonal frequency division multiplexing (OFDM), as appropriate. For example, the polarization multiplexing QPSK (Dual Polarization-QPSK) system for mapping transmission data for each of different polarization components (for example, an X polarization component and a Y polarization component) may be applied to the optical modulator.

The wavelength multiplexer 12 is configured to output the WDM signal light by wavelength-multiplexing the transmission modulation signal light of multiple wavelengths generated by each of optical transmitters 11-$i$. The wavelength multiplexer 12 may be referred to as "multiplexer (MUX) 12". An optical coupler as an example of the optical multiplexer may be applied to the wavelength multiplexer 12.

The WDM signal light outputted from the multiplexer 12 is outputted to the optical transmission path 50. The WDM signal light may be amplified by an optical amplifier (or "post amplifier" or "transmission amplifier") (not illustrated) and then outputted to the optical transmission path 50. The post amplifier may be unnecessary depending on the transmission distance of the WDM signal light.

Meanwhile, in the optical reception node 30, the wavelength demultiplexer 31 demultiplexes the WDM signal light received from the optical transmission path 50 into each of the wavelengths and outputs them to the optical receiver 32. The wavelength multiplexer 31 may be referred to as "demultiplexer (DMUX) 31". An optical coupler or an optical splitter as an example of the optical demultiplexer may be applied to the demultiplexer 31.

For example, when "digital coherent optical receiver" is applied to each of the optical receivers 32-$i$, an optical splitter configured to output the WDM signal light to each of the optical receivers 32-$i$ by branching may be applied to the demultiplexer 31. The optical splitter may be a branched coupler.

Each of the optical receivers 32-$i$ illustrated in FIG. 1 is, by way of example, a digital coherent optical receiver and may comprise a local oscillation light source (LO: local oscillation) 321, a coherent detector 322, and a digital signal processor 323.

The LO 321 outputs local oscillation light used for coherent detection. The LO 321 may be a semiconductor LD like the transmission light source of the optical transmitter 11. The semiconductor LD may be a tunable LD. Wavelength of the local oscillation light outputted by the LO 321 may be set to a wavelength corresponding to a desired reception wavelength (may be referred to as "reception wavelength") in the optical receiver 32. Local oscillation light of the reception wavelength outputted from the LO 321 is inputted into the coherent detector 322.

The coherent detector 322 mixes the local oscillation light of the reception wavelength of the LO 321 and the WDM signal light received from the optical transmission path 50 via the demultiplexer 31, and detects a beat signal according to the optical interference to convert it to an electric signal. The beat signal is electric field complex information of the signal light corresponding to the reception wavelength.

Figure 2:
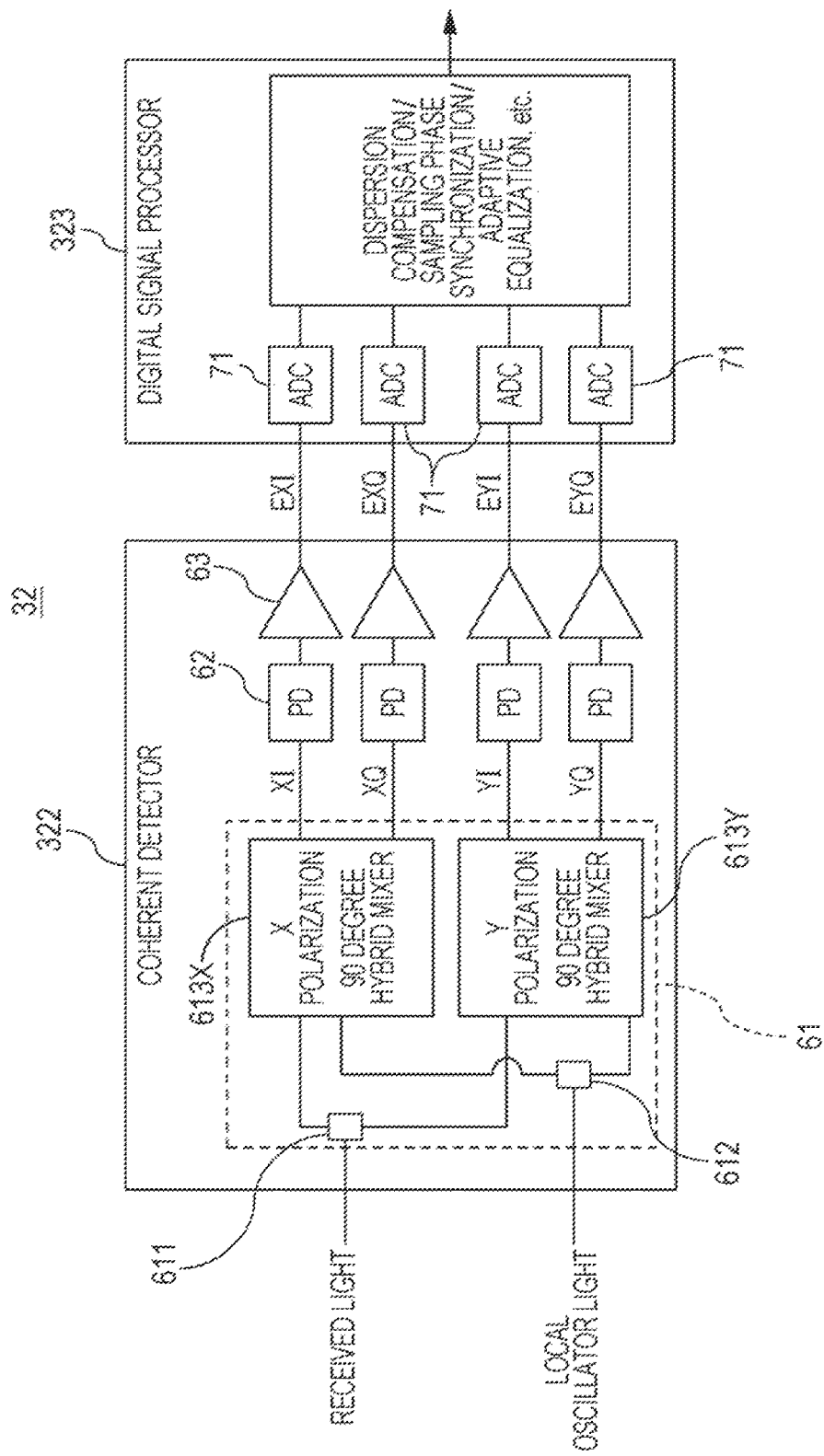
FIG. 2 is a block diagram illustrating a configuration example of an optical receiver focused on a coherent detector illustrated in FIG. 1.

FIG. 2 illustrates a configuration example of the coherent detector 322. The coherent detector 322 illustrated in FIG. 2 may comprise, by way of example, an optical front-end (FE) 61, four PDs (photodiode or photodetector) 62, and four electrical amplifiers 63. "Optical FE" may be alternatively referred to as "reception FE".

The optical FE 61 performs, by way of example, polarization diversity detection and phase diversity detection. Thus, the optical FE 61 may comprise, by way of example, a polarization beam splitter (PBS) 611, a beam splitter (BS) 612, and 90 degree hybrid mixers 613X and 613Y.

The PBS 611 demultiplexes the received signal light inputted from the demultiplexer 31 into each of the different polarization components. The different polarization components are, by way of example, polarization components orthogonal to each other, and one of the different polarization components may be referred to as an X polarization component, and the other as a Y polarization component. By way of example, the X polarization component is inputted into one 90 degree hybrid mixer 613X, and the Y polarization component is inputted into the other 90 degree hybrid mixer 613Y.

The BS 612 branches output light of the LO 321 (or "LO light") and inputs it into 90 degree hybrid mixers 613X and 613Y.

One of the 90 degree hybrid mixers, 613X causes the X polarization component inputted from the PBS 611 and the local oscillation light inputted from the BS 612 to interfere with each other by mixing them at the same phase and a different phase (for example, phases different by 90 degrees from each other).

Thus, with regard to the X polarization component, signal lights (electric field complex information) of the same phase (I-phase) component (XI) and the orthogonal (Q-phase) component (XQ) are outputted from the 90 degree hybrid mixer 613X.

Similarly, the other 90 degree hybrid mixer 613Y causes the Y polarization component inputted from the PBS 611 and the local oscillation light inputted from the BS 612 to interfere with each other by mixing them at the same phase and a different phase (for example, phases different by 90 degrees from each other).

Thus, with regard to the Y polarization component, signal lights (electric field complex information) of the same phase (I-phase) component (YI) and the orthogonal (Q-phase) component (YQ) are outputted from the 90 degree hybrid mixer 613Y.

In other words, the 90 degree hybrid mixers 613X and 613Y output signal lights (XI, XQ, YI, YQ) of two different I components and Q components for each of two different polarization components (X, Y). Each of the paths through which these four signals are transmitted may be referred to as "lane". Each of the signals of the four lanes is inputted into the PD 62.

Four PDs 62 and four electrical amplifiers 63 may be provided corresponding to the four lanes. Signal lights of the four lanes XI, XQ, YI, and YQ obtained by the 90 degree hybrid mixers 613X and 613Y are converted to electric signals (EXI, EXQ, EYI, EYQ) according to the received light power by respective PDs 62. Thus, "PD 62" may be alternatively referred to as "photoelectric converter 62".

Electrical amplifiers 63 amplify the respective electric signals EXI, EXQ, EYI, and EYQ obtained by the PDs 62 in the respective lanes. Each electrical amplifier 63 may be configured to perform automatic gain control (AGC) or manual gain control.

Electric signals EXI, EXQ, EYI, and EYQ amplified in the respective electrical amplifiers 63 are inputted into the digital signal processor 323. The digital signal processor 323 performs digital signal processing of the inputted electric signals EXI, EXQ, EYI, and EYQ.

Digital signal processing may numerically determine and compensate for deterioration factors of reception characteristics of the signal light transmitted in the optical transmission path 50, such as wavelength dispersion (CD), polarization mode dispersion (PMD), polarization dependent loss (PDL), and non-linear effect.

"Reception characteristic" may be alternatively referred to as "transmission characteristic" or "signal quality". One example of the index of "signal quality" includes optical signal to noise ratio (OSNR) and bit error rate (BER).

By way of example, the digital signal processing may include such processings as analog-to-digital conversion (ADC), dispersion compensation, sampling phase synchronization, adaptive equalization, frequency offset compensation, carrier phase recovery, and error correction decoding.

The digital signal processing may be made, by way of example, by an arithmetic device provided with arithmetic capacity. The arithmetic device may be referred to as "processor device" or as "processor circuit". The arithmetic device may be made by using a device such as a digital signal processor (DSP), a field programmable gate array (FPGA), and a large-scale integrated circuit (LSI).

Figure 3:
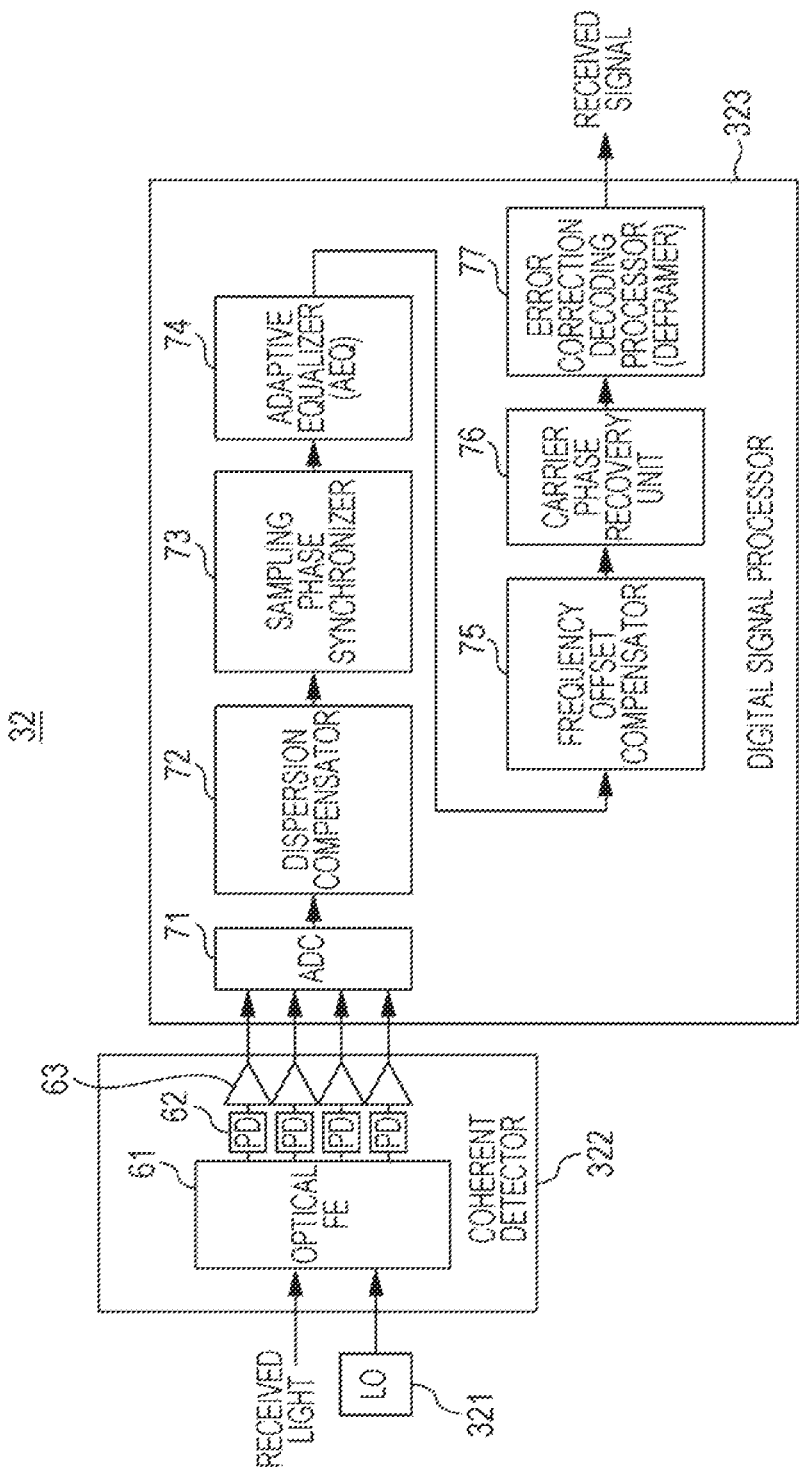
FIG. 3 is a block diagram illustrating a configuration example of an optical receiver focused on a digital signal processor illustrated in FIG. 1.

FIG. 3 illustrates a functional configuration example of the digital signal processor 323. As illustrated in FIG. 3, the digital signal processor 323 may include an analog-to-digital converter (ADC) 71, a dispersion compensator 72, a sampling phase synchronizer 73, an adaptive equalizer (AEQ) 74, a frequency offset compensator 75, a carrier phase recovery unit 76, and an error correction decoding processor 77. "AEQ" is an abbreviation for "Adaptive Equalizer".

In FIG. 3, the ADC 71 is common to the four lanes for the sake of convenience. However, as illustrated in FIG. 2, the ADC 71 may be provided for each of the lanes. The ADC 71 converts the analog electric signals (EXI, EXQ, EYI, EYQ) corresponding to the signal lights demodulated by the coherent detector 322 to the digital electric signals. In the ADC 71, the inputted analog electric signal may be, by way of example, digitally sampled two or more times for one symbol.

By the digital sampling, analog waveform information including phase information is quantized to a digital value. By converting analog waveform information to digital values in this way, various characteristic compensations may be performed by arithmetic processing of the digital values.

Digital electric signals (EXI, EXQ, EYI, EYQ) outputted from the ADC 71 are coupled separately for the X polarization component and the Y polarization component (or "complex conversion"), and then processed in the complex time series of two lines in the subsequent digital signal processing. For example, digital electric signals of the X polarization component EXI and EXQ are processed in the complex time series, and digital electric signals of the Y polarization component EYI and EYQ are processed in the complex time series.

The dispersion compensator 72 performs, by way of example, wavelength dispersion compensation of digital electric signals inputted from the ADC 71 for each of the polarization components. By way of example, a digital filter such as a transversal filter modeling a waveform distortion by wavelength dispersion may be applied to the wavelength dispersion compensation.

The sampling phase synchronizer 73 performs a processing for optimizing the timing (or frequency and phase) of digital sampling in the ADC 71. Optimization of the sampling timing, for example, may be achieved by synchronizing the sampling timing with a center of the data pulse.

By way of example, the AEQ 74 may comprise a finite impulse response (FIR) filter which is one example of the digital filter. The FIR may be referred to as "AEQ filter" for the sake of convenience. Also, the AEQ 74 may be referred to as AEQ filter 74 for the sake of convenience.

By updating the coefficient of the FIR filter, for example, at a speed higher than polarization fluctuation of the signal light and in an adaptive manner, waveform distortion caused by polarization fluctuation or polarization mode dispersion (PMD) may be equalized (compensated) adaptively. The coefficient of the FIR filter is an example of the filter parameter and may be referred to as "filter coefficient", "tap coefficient", or "equalization weight" for the sake of convenience.

Figure 4:
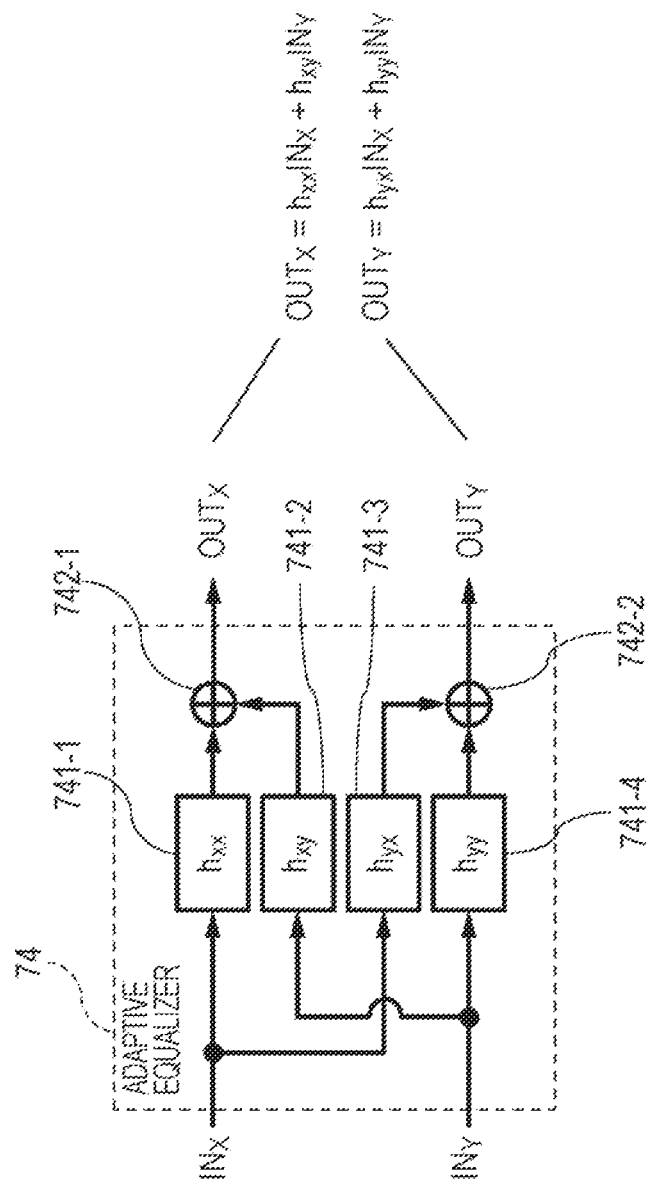
FIG. 4 is a block diagram illustrating a configuration example of a digital filter in an adaptive equalizer illustrated in FIG. 3.

As illustrated in FIG. 4, the AEQ 74 receives, by way of example, complex time series ($IN_X$ and $IN_Y$) of 2 lines. Here, the X polarization component and the Y polarization component are main axes of the coherent detector 322. Therefore, input signals $IN_X$ and $IN_Y$ into the AEQ 74 positioned at a rear stage of the coherent detector 322 include a mixture of the polarization components subjected to polarization multiplexing by the optical transmitter 11.

Thus, the AEQ 74 may comprise a function that separates input signals $IN_X$ and $IN_Y$ into complex time series $OUT_X$ and $OUT_Y$ of respective polarization components subjected to polarization multiplexing in the optical transmitter 11.

Here, the I/O function of the AEQ 74 (or FIR filter) illustrated in FIG. 4 is expressed by Equations 1 and 2 as follows:

$$OUT_X = h_{xx}IN_X + h_{xy}IN_Y \qquad 1$$

$$OUT_Y = h_{yx}IN_X + h_{yy}IN_Y \qquad 2$$

In FIG. 4 and Equations 1 and 2, $h_{xx}$, $h_{xy}$, $h_{yx}$, and $h_{yy}$ represent tap coefficients of the FIR filter respectively, and the tap coefficient h and input signal IN are subjected to convolution operation in the time domain. In FIG. 4, each of the reference numerals 741-1 to 741-4 represents a convolution operation unit performing the convolution operation.

Arithmetic operation of Equation 1 is performed by summing operation results of convolution operation units 741-1 and 741-2 in an adder 742-1. Arithmetic operation of Equation 2 is performed by summing operation results of convolution operation units 741-3 and 741-4 in an adder 742-2.

As one example of a method for adaptively controlling tap coefficients illustrated in FIG. 4 (may be referred to as "algorithm"), the modulus algorithm (CMA) method may be applied. The CMA method adaptively updates the tap coefficient such that the absolute value of the complex amplitude is invariable.

Referring back to FIG. 3, the frequency offset compensator 75 compensates for a frequency deviation (or may be referred to as "offset") between the received signal light and the output light of the LO 321 based on the output signals ($OUT_X$ and $OUT_Y$) of the AEQ74.

For estimation of the frequency offset, by way of example, an estimation method called the exponentiation method or an estimation method called the pre-decision based angle differential frequency offset estimator (PADE) allowing the possible estimable range of the frequency offset larger than the exponentiation method may be applied.

The carrier phase recovery unit 76 removes the noise component from the received digital signal of which the frequency offset is compensated by the frequency offset compensator 75, estimates a correct carrier phase, and synchronizes the phase of the received digital signal with an estimated carrier phase. The noise component includes noises such as the spontaneous emission light (amplified spontaneous emission, ASE) noise and the laser phase noise.

By way of example, for estimation of the carrier phase, a feedback method of removing noise effects using a digital loop filter or the feedforward method of removing noise effects by averaging the estimated phase difference detected by the phase detector may be applied.

The error correction decoding processor 77, for example, performs error correction decoding of the received digital signal based on an error correcting code added to the transmission signal in digital signal processing by the optical transmitter 11. By way of example, the forward error correction (FEC) code may be applied as the error correcting code.

The error correction decoding processor 77 may perform the deframer processing for the received digital signal. One example of the deframer processing is a processing of demapping a client signal mapped into a frame of the received digital signal.

One example of the client signal is a frame signal of the Ethernet (registered trade mark), a frame signal of the synchronous digital hierarchy (SDH) or a frame signal of the synchronous optical network (SONET).

As described above, the digital coherent optical receiver 32 may compensate, by digital signal processing, for the deterioration of transmission characteristics caused by various signal deterioration factors in the signal light transmitted in the optical transmission path 50.

However, there is a limit of the compensation by digital signal processing, and a characteristic deterioration which is beyond a limit of compensation may not be compensated. As one of deterioration factors of the transmission characteristics, the polarization dependent loss (PDL) is known.

When a signal light is transmitted through an optical part having the PDL (hereinafter may be referred to as "PDL part"), an optical loss difference is caused between polarization components. The optical transmission path 50 is also one example of the PDL part having the PDL.

Figure 5:
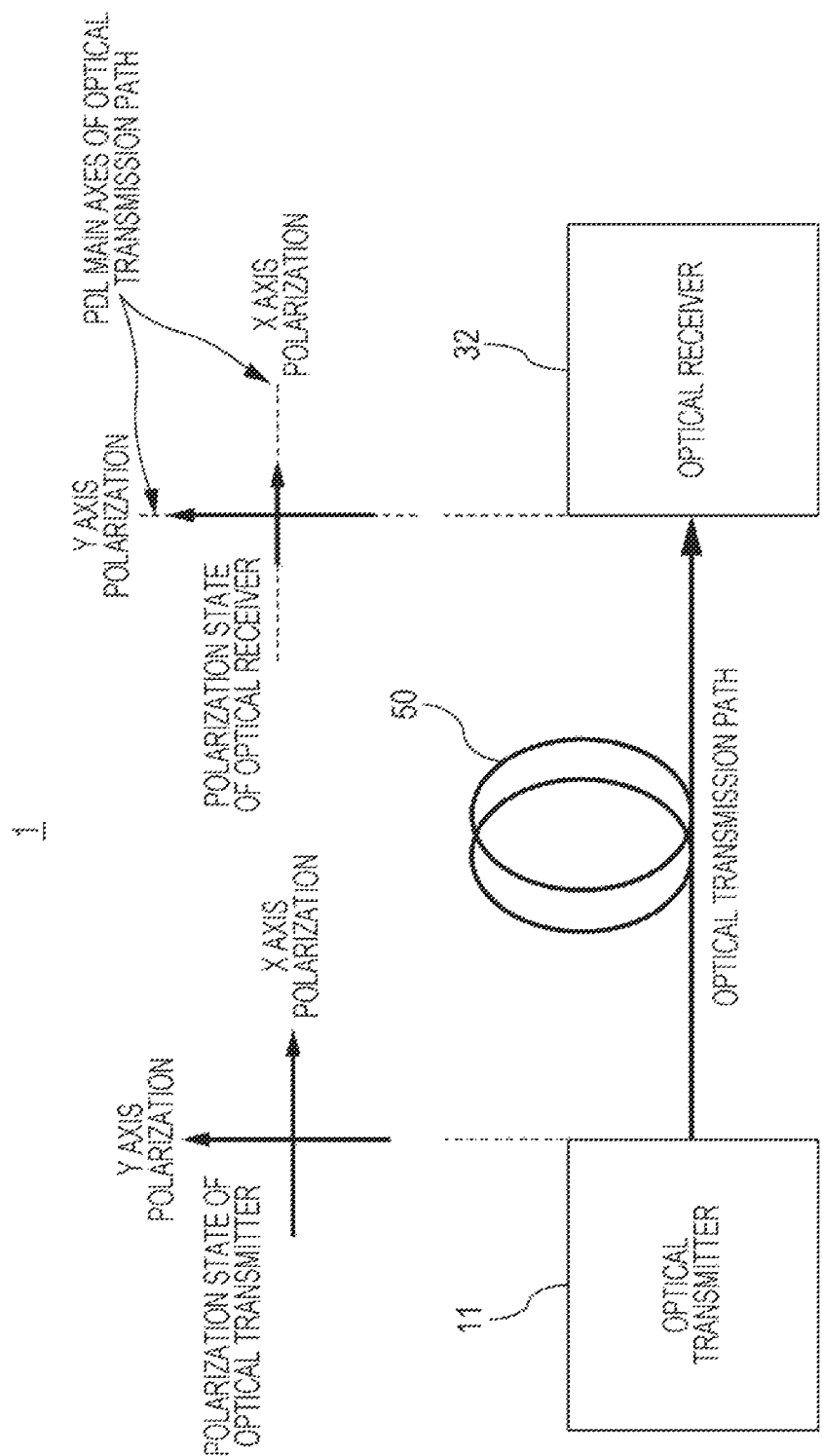
FIG. 5 is a schematic diagram for illustrating a PDL which a signal light undergoes in an optical transmission path.

For example, as schematically illustrated n FIG. 5, assume that the X polarization component and the Y polarization component subjected to orthogonal polarization multiplexing by the optical transmitter 11 respectively enter along two orthogonal PDL main axes of the optical transmission path 50.

A polarization component transmitted along one of two PDL axes undergoes a relatively significant optical loss than a polarization component transmitted along another PDL main axis. Therefore, a loss difference between polarization components of the received orthogonally polarized multiplex signal occurs in the optical receiver 32. Reception characteristics in the optical receiver 32 deteriorate depending on the loss difference caused between the polarization components.

Thus, for example, if the PDL could be measured (or may be referred to as "monitored" or" "detected") more accurately in the optical reception node 30, reception characteristics may be improved. Also, if accurate PDL could be measured, a sign and a factor of the signal quality deterioration may be figured out. Further, based on the accurate measured value of the PDL, design of the transmission path in the optical transmission system 1 may be optimized.

By way of example, the PDL of the optical transmission path 50 may be calculated based on the monitor value obtained by monitoring the tap coefficient of the FIR filter in the AEQ 74.

For example, the tap coefficient (matrix) $h_{FIR}(t)$ of the FIR filter in the time domain may be expressed by Equation 3 given below. The tap coefficient matrix $h_{FIR}(t)$ in the time domain may be considered to correspond to a tap coefficient matrix before being subjected to discrete fourier transformation (DFT) or fast Fourier transformation (FFT).

$$h_{FIR}(t) = \begin{bmatrix} h_{xx}(t) & h_{xy}(t) \\ h_{yx}(t) & h_{yy}(t) \end{bmatrix} \quad 3$$

When the tap coefficient matrix $h_{FIR}(t)$ in the time domain is subjected to the DFT or FFT, a tap coefficient matrix $H_{FIR}(\omega)$ in the frequency domain expressed by Equation 4 may be obtained.

$$H_{FIR}(\omega) = \begin{bmatrix} H_{xx}(\omega) & H_{xy}(\omega) \\ H_{yx}(\omega) & H_{yy}(\omega) \end{bmatrix} \quad 4$$

Here, "$\omega$" represents the angular frequency of the optical carrier wave, and may be expressed in Equation 5 given below. "$\Delta\omega$" in Equation 5 may be expressed in Equation 6 given below. "f" in Equation 6 represents the log acquisition cycle (sampling cycle). By representing the bit rate of the signal light as "B", "f" may be expressed in Equation 7 given below. "N" in Equation 6 represents the number of taps in the FIR filter, and "n" in Equation 5 represents the tap number.

$$\omega = n\Delta\omega \quad 5$$

$$\Delta\omega = 2\pi \frac{f}{N} \quad 6$$

$$f = \frac{B}{4} \times 2 \quad 7$$

The cycle f expressed in Equation 7 means that the ADC 71 operates at a double sampling rate.

Here, as indicated in Equation 8 given below, an inverse matrix of the tap coefficient matrix $H_{FIR}(\omega)$ indicated in Equation 4 is set as a matrix $M(\omega)$.

$$M(\omega) = H_{FIR}(\omega)^{-1} = \begin{bmatrix} H_{xx}(\omega) & H_{xy}(\omega) \\ H_{yx}(\omega) & H_{yy}(\omega) \end{bmatrix}^{-1} \quad 8$$

PDL [dB] may be determined from Equation 10 given below by applying the singular value ($S_1$, $S_2$) or the eigenvalue ($\rho_1$, $\rho_2$) of the product of the matrix $M(\omega)$ multiplied by the Hermitian matrix $M(\omega)^H$ of the matrix $M(\omega)$ expressed in Equation 9 given below.

$$M(\omega)^H M(\omega) \quad 9$$

$$PDL_{dB} = \left| 20 \log_{10}\left(\frac{S_1}{S_2}\right) \right| = \left| 10 \log_{10}\left(\frac{\rho_1}{\rho_2}\right) \right| \quad 10$$

However, the above PDL calculation method may not calculate accurate PDL if the electrical amplifier 63 of respective lanes illustrated in FIGS. 2 and 3 has been subjected to the AGC. In other words, a PDL calculated by Equation 10 may have a large error with respect to the actual PDL.

For example, electrical amplifiers 63 are subjected to the AGC such that respective amplitudes (absolute values) of electric signals EXI, EXQ, EYI, and EYQ for four lanes inputted into the digital signal processor 323 are equal to each other (that is, |EXI|=|EXQ|=|EYI|=|EYQ|).

In this case, information of the PDL, which is included in the output amplitude information of the coherent detector 322 and which the signal light receives from the optical transmission path 50, is adjusted according to the AGC. Thus, information of the PDL which the signal light actually receives from the optical transmission path 50 is not reflected on the tap coefficient of the FIR filter. Therefore, even if the PDL of the optical transmission path 50 is calculated by the above calculation method by monitoring the tap coefficient, a large error may occur.

Figure 8:
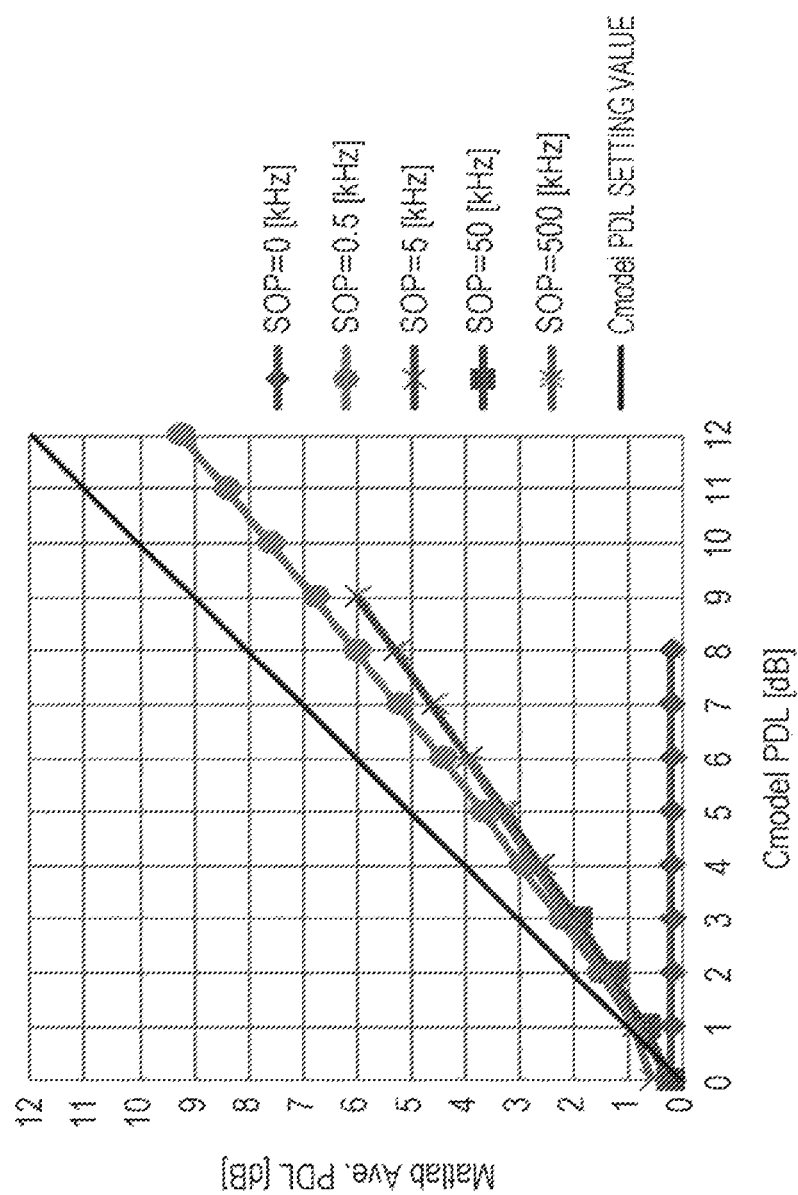
FIG. 8 illustrates that an error occurs in a PDL calculation value when an electrical amplifier illustrated in FIG. 2.

FIG. 8 illustrates an example of characteristics between the PDL setting value (ordinate) versus the PDL calculation value calculated by the above PDL calculation method (abscissa) when the AGC is performed such that signal amplitudes between lanes are equal to each other and invariable.

FIG. 8 illustrates, by way of example, respective characteristic examples when polarization state (SOP) of the signal light is 0 [kHz], 0.5 [kHz], 5 [kHz], 50 [kHz], and 500 [kHz].

FIG. 8 indicates that when output signal amplitudes of respective lanes are equal to each other, an error may occur in the PDL calculation value with respect to the PDL setting value represented by a straight line having the inclination of "1".

For solving the above problem, in the present embodiment, for example, the optical receiver 32 of the optical reception node 30 performs arithmetic operation of removing (canceling) the gain value component used for the AGC of the electrical amplifier 63 in the coherent detector 322 from the tap coefficient of the FIR filter.

By calculating the PDL monitor value based on a tap coefficient from which the gain value component of the AGC has been removed, error of the PDL monitor value may be reduced and thereby PDL measurement precision may be improved. "Removing the gain value component from the tap coefficient" may be rephrased as "correcting the tap coefficient with the gain value component". Therefore, "tap coefficient from which the gain value component is removed" may be rephrased as "corrected tap coefficient".

Figure 6:
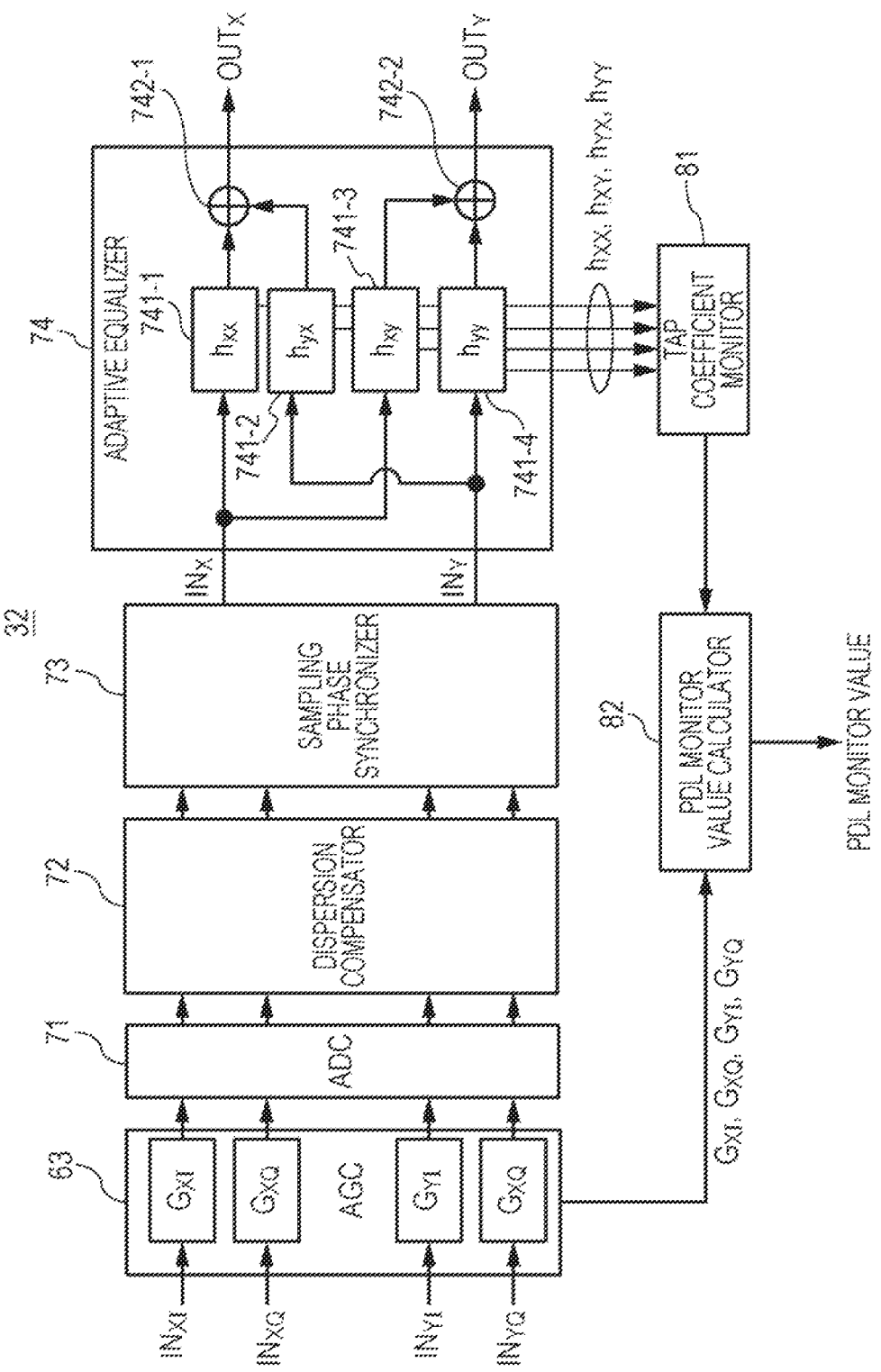
FIG. 6 is a block diagram illustrating a configuration example of an optical receiver illustrated in FIG. 1.

Hereinafter, a specific example is described with reference to FIG. 6. FIG. 6 is a block diagram illustrating a configuration focused on the electrical amplifier 63, the ADC 71, the dispersion compensator 72, the sampling phase synchronizer 73, and the AEQ 74, in the configuration example of the optical receiver 32 illustrated in FIG. 3.

However, the optical receiver 32 illustrated in FIG. 6 additionally comprises a tap coefficient monitor 81 and a PDL monitor value calculator 82. The tap coefficient monitor 81 is one example of the filter parameter monitor, and the PDL monitor value calculator 82 is one example of the polarization dependent loss calculator.

As illustrated in FIG. 6, received signals (complex time series) $IN_{XI}$, $IN_{XQ}$, $IN_{YI}$, $IN_{YQ}$ for four lanes converted to electric signals by the coherent detector 322 are amplified with respective gain values $G_{XI}$, $G_{XQ}$, $G_{YI}$, $G_{YQ}$ by the electrical amplifier 63 in the corresponding lanes.

Gain values $G_{XI}$, $G_{XQ}$, $G_{YI}$, $G_{YQ}$ are subjected to the AGC such that respective amplitudes (absolute values) of signals $IN_{XI}$, $IN_{XQ}$, $IN_{YI}$, $IN_{YQ}$ for four lanes to be inputted into the ADC 71 are equal to one another.

Here, received signals (complex time series) $IN_{XI}$, $IN_{XQ}$, $IN_{YI}$, $IN_{YQ}$, to which gain values of the AGC are applied, are coupled for each of polarization components (complex conversion) through the ADC 71, the dispersion compensator 72 and the sampling phase synchronizer 73.

Complex time series $IN_X$ and $IN_Y$ of two lines are obtained by complex conversion and inputted into the AEQ 74. The AEQ 74 separates input signals $IN_X$ and $IN_Y$ into complex time series $OUT_X$ and $OUT_Y$ of respective polarization components subjected to polarization multiplexing in the optical transmitter 11, before outputting them.

Similarly with Equation 1 and Equation 2, the I/O function of the FIR filter in the AEQ 74 illustrated in FIG. 6 is expressed by Equations 11 and 12 as follows:

$$OUT_X = h_{xx}IN_X + h_{yx}IN_Y \quad\quad 11$$

$$OUT_Y = h_{xy}IN_X + h_{yy}IN_Y \quad\quad 12$$

Figure 7:
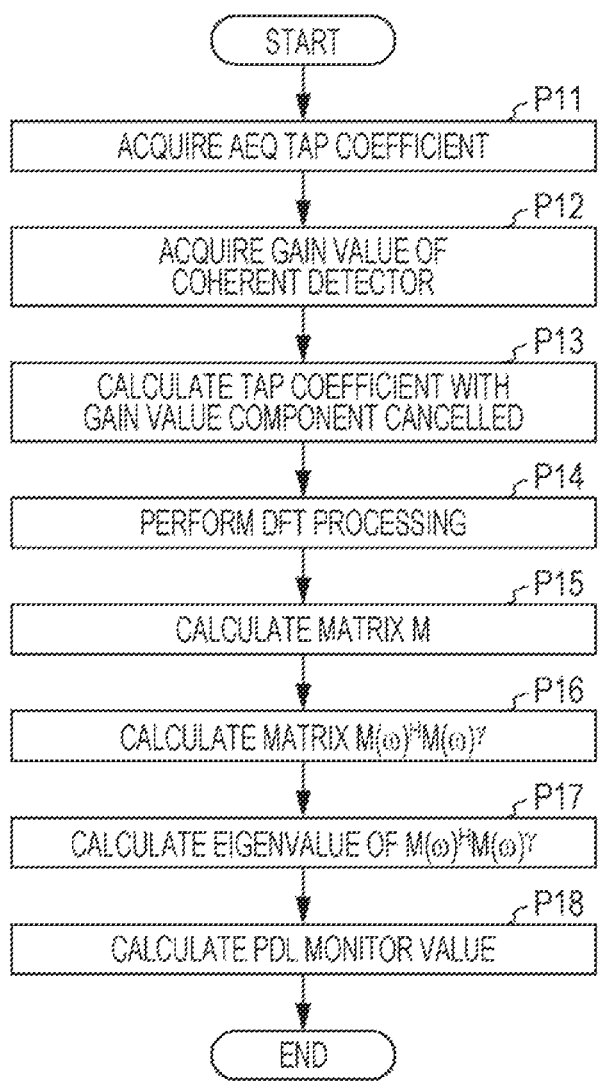
FIG. 7 is a block diagram illustrating an exemplary operation of the optical receiver illustrated in FIG. 6.

Tap coefficients ($h_{xx}$, $h_{yx}$, $h_{xy}$, $h_{yy}$) in Equations 11 and 12 may be monitored by the tap coefficient monitor 81 (Operation P11 in FIG. 7). "Monitoring" of the tap coefficient may be alternatively referred to as "acquisition" or "detection" of the tap coefficient.

Here, monitored tap coefficients ($h_{xx}$, $h_{yx}$, $h_{xy}$, $h_{yy}$) include components of gain values ($G_{XI}$, $G_{XQ}$, $G_{YI}$, $G_{YQ}$) of four lanes. For example, the tap coefficient, to which the CMA algorithm has been applied, is multiplied by the reciprocal of the product of an input signal to the FIR filter and a gain value in the AGC.

Therefore, for example, the gain value component may be removed from the tap coefficient monitored by the tap coefficient monitor 81 by using Equation 13 given below.

$$h_{Ixx}' = h_{Ixx} \times G_{XI} \quad h_{Qxx}' = h_{Qxx} \times G_{XQ}$$

$$h_{Ixy}' = h_{Ixy} \times G_{XI} \quad h_{Qxy}' = h_{Qxy} \times G_{XQ}$$

$$h_{Iyx}' = h_{Iyx} \times G_{YI} \quad h_{Qyx}' = h_{Qyx} \times G_{YQ}$$

$$h_{Iyy}' = h_{Iyy} \times G_{YI} \quad h_{Qyy}' = h_{Qyy} \times G_{YQ} \quad\quad 13$$

However, in Equation 13, $h_{(I/Q)xx}'$, $h_{(I/Q)xy}'$, $h_{(I/Q)yx}'$, and $h_{(I/Q)yy}'$ each represent a tap coefficient for each of in-phase (I) components and quadrature (Q) components from which the gain value component is removed for each of the I components and the Q components.

Therefore, tap coefficients $h_{xx}'$, $h_{xy}'$, $h_{yx}'$, and $h_{yy}'$ from which the gain value component is removed and which are obtained by combining the I components and the Q components may be expressed by Equation 14 given below.

$$h_{xx}' = h_{Ixx}' + jh_{Qxx}'$$

$$h_{xy}' = h_{Ixy}' + jh_{Qxy}'$$

$$h_{yx}' = h_{Iyx}' + jh_{Qyx}'$$

$$h_{yy}' = h_{Iyy}' + jh_{Qyy}'$$

Note that gain values ($G_{XI}$, $G_{XQ}$, $G_{YI}$, $G_{YQ}$) of electrical amplifiers 63 during the AGC may be considered to be in the relation of $G_{XI} = G_{XQ}$ and $G_{YI} = G_{YQ}$. Thus, for example, tap coefficients $h_{xx}'$, $h_{xy}'$, $h_{yx}'$, and $h_{yy}'$ may be obtained by removing the gain value component from the tap coefficient ($h_{xx}'$, $h_{xy}'$, $h_{yx}'$, $h_{yy}'$) by using Equation 15 given below.

$$h_{xx}' = h_{xx} \times \frac{G_{XI} + G_{XQ}}{2} \quad\quad 15$$

$$h_{xy}' = h_{xy} \times \frac{G_{XI} + G_{XQ}}{2}$$

$$h_{yx}' = h_{yx} \times \frac{G_{YI} + G_{YQ}}{2}$$

$$h_{yy}' = h_{yy} \times \frac{G_{YI} + G_{YQ}}{2}$$

Arithmetic operation expressed by Equation 13 to Equation 15 may be performed, by way of example, by the PDL monitor value calculator 82. For example, the PDL monitor value calculator 82 monitors gain values $G_{XI}$, $G_{XQ}$, $G_{YI}$, $G_{YQ}$ of electrical amplifiers 63 for four lanes (Operation P12 of FIG. 7).

Using monitored gain values $G_{XI}$, $G_{XQ}$, $G_{YI}$, $G_{YQ}$, the PDL monitor value calculator 82 calculates corrected tap coefficients with gain value components removed by arithmetic operation of Equations 13 and 14 (or Equations 13 and 15) (Operation P13 of FIG. 7).

The PDL monitor value calculator 82 performs arithmetic operations indicated in Equations 4 to 10 based on corrected tap coefficients $h_{xx}'$, $h_{xy}'$, $h_{yx}'$, $h_{yy}'$ expressed in Equation 14 or Equation 15. Thus, accuracy of the calculated PDL monitor value may be enhanced.

For example, the PDL monitor value calculator 82 determines corrected tap coefficient matrix $H_{FIR}(\omega)$ in the frequency domain illustrated in Equation 4 to Equation 7 by DFT (or FFT) processing (Operation P14 of FIG. 7).

Then, the PDL monitor value calculator 82 calculates the matrix $M(\omega)$ illustrated in Equation 8 based on the determined corrected tap coefficient matrix $H_{FIR(\omega)}$ (Operation P15 of FIG. 7).

Further, the PDL monitor value calculator 82 determines the Hermitian matrix $M(\omega)^H$ of the calculated matrix $M(\omega)$ and calculates the product of the Hermitian matrix $M(\omega)^H$ and the matrix $M(\omega)$ illustrated in Equation 9 (Operation P16 of FIG. 7).

Then, the PDL monitor value calculator 82 calculates the singular value or the eigenvalue of Equation 9 (Operation P17 of FIG. 7), and calculates, based on the calculation result, the PDL monitor value by Equation 10 (Operation P18 of FIG. 7).

Figure 9:
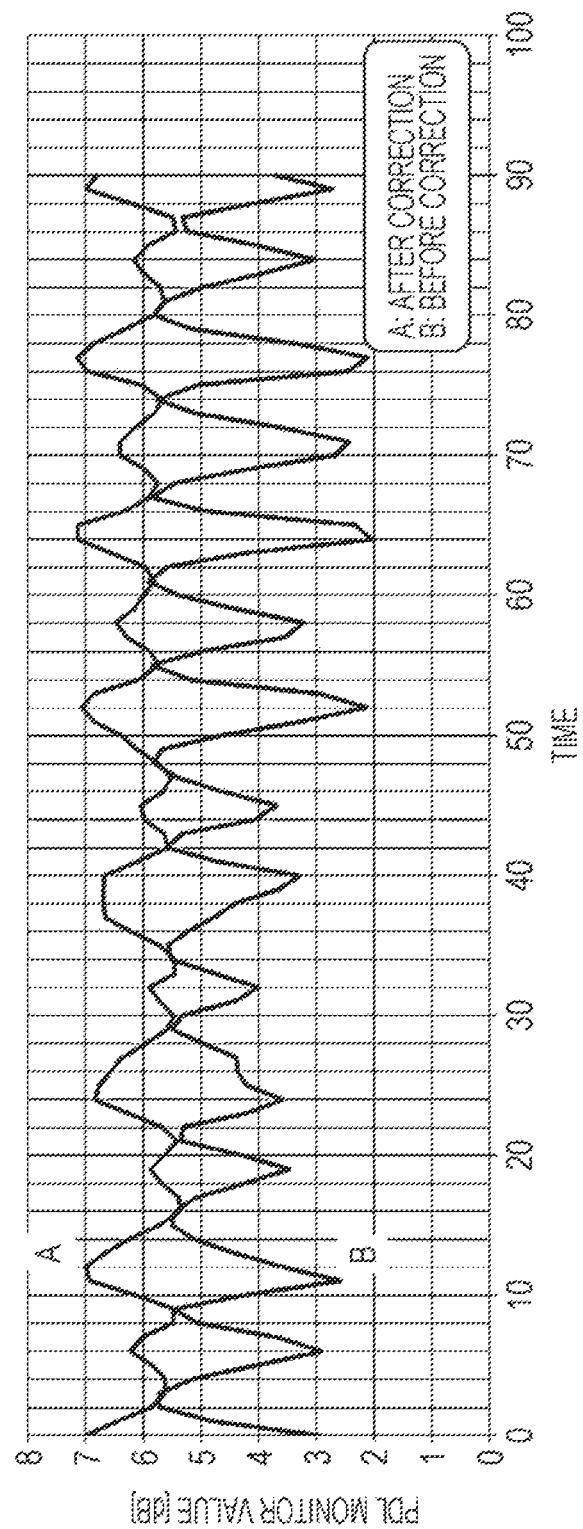
FIG. 9 illustrates an example of time variation characteristics of the PDL calculation value.

Here, FIG. 9 illustrates an example of time variation characteristics of calculation results of the PDL monitor value when output signal amplitudes of respective lanes to the AEQ 74 are equal to each other and invariable with the PDL setting value of the optical transmission path 50 set to 6 [dB].

Characteristic B illustrated on the lower side in FIG. 9 corresponds to the characteristic of a PDL monitor value calculated based on tap coefficients with gain value components not removed therefrom. Characteristic A illustrated on the upper side in FIG. 9 corresponds to the characteristic of a PDL monitor value calculated based on corrected tap coefficients with gain value components removed therefrom as described above.

Compared with the characteristic A, the characteristic B violently fluctuates in domains significantly deviated from the PDL setting value of 6 [dB].

For example, in the characteristic B, as polarization state (SOP) of the signal light changes, the PDL calculation value varies and thereby the PDL setting value=6 [dB] is not obtained. In other words, error variation occurs in the PDL calculation value depending on the SOP.

On the contrary, the characteristic A indicates that variation of the PDL calculation value is relatively small in the vicinity of the PDL setting value of 6 [dB] as compared with the characteristic B. Thus, It is seen that the PDL calculation value may be obtained with a precision higher than the characteristic A.

Recording the PDL calculation value, for example, in a log during operation of the optical transmission system 1 makes it possible to predict deterioration of signal quality and identify a factor of the deterioration easily. The high precision PDL calculation value may also be used, for example, for transmission path design and optimization of the optical transmission system 1.

Calculation of the corrected tap coefficient and calculation of the PDL monitor value, described above, based on the corrected tap coefficient may be performed within the optical receiver 32. Therefore, a large-scale modification of the optical transmission system 1 for calculation of the PDL monitor value does not have to be made.

In the above example, the gain values $G_{XT}$, $G_{XQ}$, $G_{YT}$, $G_{YQ}$ for all of the four lanes are used to determine the corrected tap coefficient. However, the used gain values may be limited to some of the gain values. For example, in the gain value of the coherent detector 322, the in-phase (I) component and the quadrature (Q) component may be considered to be the same ($G_{XT}=G_{XQ}$, $G_{YT}=G_{YQ}$). Therefore, by monitoring the gain value of two or more lanes, the corrected tap coefficient may be obtained in the same manner as above.

Gain value combination examples for two or more lanes to be monitored are given below. Case #9 corresponds to a case where the gain values $G_{XT}$, $G_{XQ}$, $G_{YT}$, $G_{YQ}$ for all of the four lanes described above are used.

Case #1: $G_{XT}$, $G_{YT}$
Case #2: $G_{XQ}$, $G_{YQ}$
Case #3: $G_{XT}$, $G_{YQ}$
Case #4: $G_{XQ}$, $G_{YT}$
Case #5: $G_{XT}$, $G_{YT}$, $G_{XQ}$
Case #6: $G_{XT}$, $G_{YT}$, $G_{YQ}$
Case #7: $G_{XQ}$, $G_{YQ}$, $G_{XT}$
Case #8: $G_{XQ}$, $G_{YQ}$, $G_{YT}$
Case #9: $G_{XT}$, $G_{YT}$, $G_{XQ}$, $G_{YQ}$ Hereinafter, examples of the node comprising the tap coefficient monitor 81 and the PDL monitor value calculator 82 described above with reference to FIG. 6 are described. The tap coefficient monitor 81 and the PDL monitor value calculator 82 may be collectively referred to as "PDL monitor function".

First Embodiment

Figure 10:
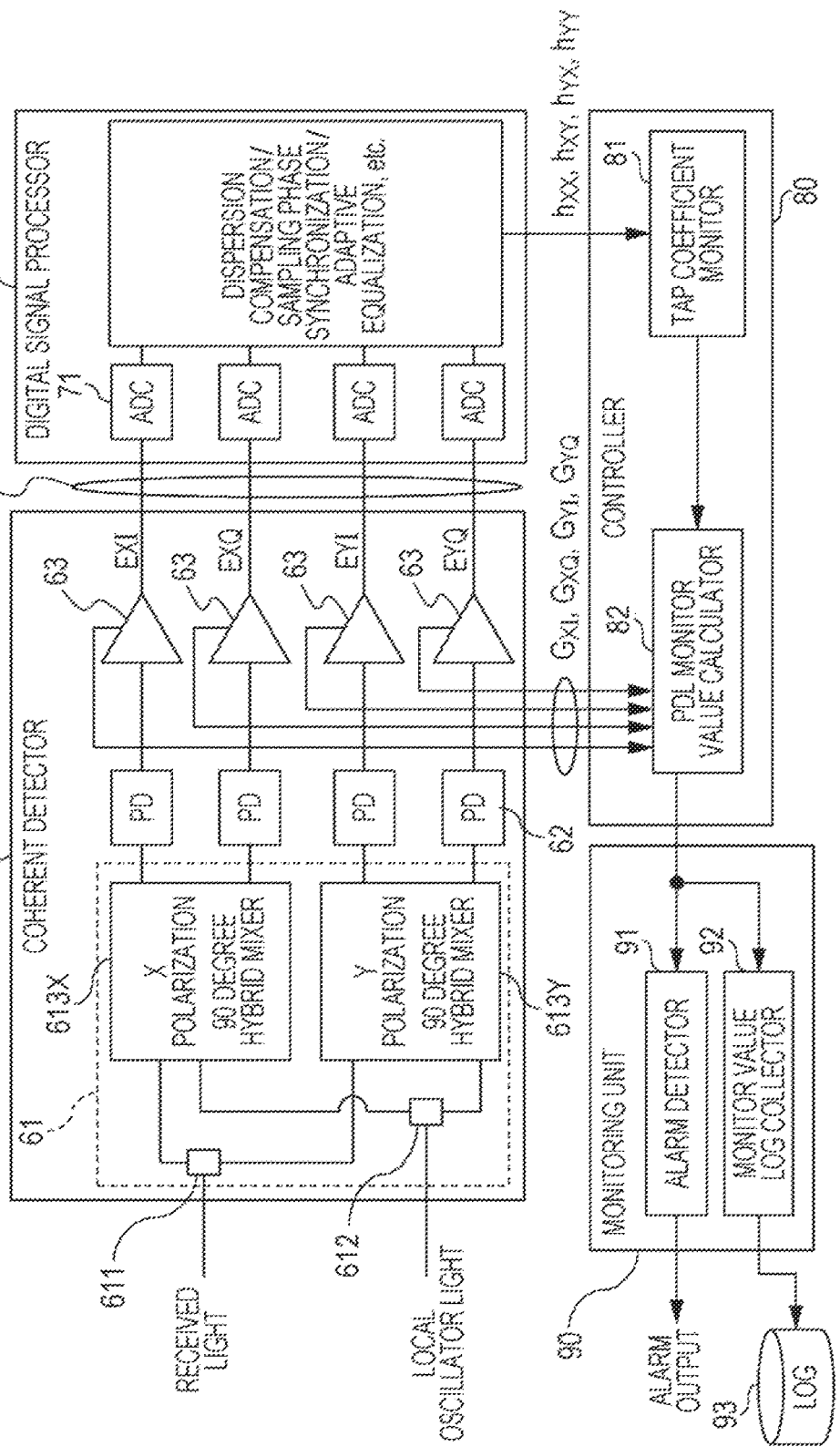
FIG. 10 is a block diagram illustrating a configuration example of a node according to a first embodiment.

FIG. 10 is a block diagram illustrating a configuration example of a node according to the first embodiment. The node illustrated in FIG. 10 may be considered to correspond to the optical reception node 30 illustrated in FIG. 1.

The node 30 may comprise a controller 80 and a monitoring unit 90, as well as elements of the optical receiver 32 including the LO 321, the coherent detector 322, and the digital signal processor 323.

One or both of the controller 80 and monitoring unit 90 may be provided inside the optical receiver 32, or may be provided outside the optical receiver 32 and the inside the node 30. In other words, one or both of the controller 80 and the monitoring unit 90 may be provided individually inside each optical receiver 32-*i*, or may be provided in a section common to the optical receivers 32-*i* inside the node 30.

The controller 80 may comprise the tap coefficient monitor 81 and the PDL monitor value calculator 82. The controller 80 comprising the tap coefficient monitor 81 and the PDL monitor value calculator 82 may be referred to as "PDL monitor 80".

In FIG. 10, the signal light received by the node 30 is converted to electric signals for total four lanes of I components and Q components corresponding to respective X polarization components and Y polarization components in the coherent detector 322. The electric signal of each lane is amplified by the electrical amplifier 63 of the corresponding lane.

When the electric signals are amplified, gain values ($G_{XT}$, $G_{XQ}$, $G_{YT}$, $G_{YQ}$) of the electrical amplifiers 63 are subjected to the AGC such that input amplitudes to the digital signal processor 323 are equal to each other and invariable. The AGC may be performed, by way of example, by the controller 80.

For example, the controller 80 may monitor the output signal amplitude of the electrical amplifier 63 of each lane and then perform the AGC based on the monitoring result. The gain values ($G_{XT}$, $G_{XQ}$, $G_{YT}$, $G_{YQ}$) of the AGC in the lanes may be monitored, by way of example, by the PDL monitor value calculator 82 of the controller 80.

The electric signal of each lane subjected to the AGC is inputted into the digital signal processor 323. The digital signal processor 323 controls tap coefficients ($h_{xx}$, $h_{xy}$, $h_{yx}$, $h_{yy}$) of the AEQ filter 74 in an adaptive manner, for example, based on the CMA method such that the absolute value of the complex amplitude of the electric signal in each lane is invariable.

The tap coefficients of the AEQ filter 74 are monitored, by way of example, by the tap coefficient monitor 81 of the controller 80. The monitored tap coefficients are inputted, by way of example, into the PDL monitor value calculator 82.

The PDL monitor value calculator 82 calculates, as described above, a corrected tap coefficient by canceling a gain value component from the tap coefficient based on the gain value used for the AGC and the tap coefficient monitored by the tap coefficient monitor 81. The PDL monitor value calculator 82 calculates, as described above, an accurate PDL monitor value based on the calculated corrected tap coefficient.

The PDL monitor value calculated by the PDL monitor value calculator 82 may be provided to the monitoring unit 90. Based on the accurate PDL monitor value calculated by the PDL monitor value calculator 82, the monitoring unit 90 may perform alarm detection, acquisition of an operation log of the node 30 and the optical transmission system 1, and so on.

As illustrated in FIG. 10, the monitoring unit 90 may comprise, by way of example, an alarm detector 91 and a monitor value log collector 92. Both the alarm detector 91 and the monitor value log collector 92 may be an optional function, and either of the functions might not be achieved.

The alarm detector 91 may, by way of example, detect an alarm related to a transmission characteristic of the signal light transmitted through the optical transmission path 50 by comparing the PDL monitor value calculated by the PDL monitor value calculator 82 with a predetermined threshold value. The threshold value used for the alarm detection may be set to 3 [dB] as a non-limiting example.

In this case, when the PDL monitor value becomes 3 [dB] or more, the alarm detector 91 may determine that transmission characteristic deterioration of the signal light is not negligible and transmit an alarm signal, for example, to a higher-level device of the node 30 (or host system).

The host system may be, by way of example, a system performing operation, monitoring, maintenance, and so on of the optical transmission system 1, which is referred to as a network management system (NMS), an operation system (OPS), and so on.

The output destination of the alarm signal is not limited to the NMS and the OPS, but may be, for example, an operator terminal and so on coupled to the node 30 in a manner allowing mutual communication. By receiving the alarm signal detected by the alarm detector 91, the host system and operator terminal may detect that deterioration of transmission characteristics occurs in the main signal light transmitted through the optical transmission path 50.

Therefore, deterioration of transmission characteristics of the main signal light may be detected from the PDL at an early stage, and thereby early identification of deterioration factors and quick actions against deterioration of transmission characteristics become possible. Here, alarm detection accuracy is also improved because the alarm detector 91 performs the alarm detection based on the accurate PDL monitor value calculated by the PDL monitor value calculator 82. Therefore, unnecessary issue of the alarm signal due to low alarm detection accuracy may be avoided or reduced.

Meanwhile, the monitor value log collector 92 may, by way of example, store the PDL monitor value calculated by the PDL monitor value calculator 82 in the storage device 93 as an operation log during operation of the node 30. The operation log stored in the storage device 93 may be utilized for transmission path design in the optical transmission system 1, and so on. The PDL monitor value stored as an operation log is so accurate as above that the transmission path design may be optimized easily.

The storage device 93 may be provided outside the monitoring unit 90 and inside the node 30, as illustrated in FIG. 10. However, the storage device 93 may be provided inside the monitoring unit 90. Alternatively, the storage device 93 may correspond to a storage device provided in the NMS or the OPS, or may correspond to a storage device of the operator terminal.

Second Embodiment

The PDL monitor value obtained in the optical reception node 30 as described above may be notified (or may be referred to as "fed back"), by way of example, to the optical transmission node 10. Notification of the PDL monitor value may be made, by way of example, by superimposing information indicating the PDL monitor value as one example of the notification information on a light which the optical reception node 30 transmits to the optical transmission node 10 by frequency modulation.

The notification information may be considered as one example of the monitor control information. A transmission light on which monitor control information is superimposed may be considered a light including a Supervisory (SV) light component or an optical supervisory channel (OSC) component.

The optical transmission node 10 demodulates and detects the PDL monitor value superimposed on the received signal light by frequency modulation in the optical reception node 30. Based on the detected PDL monitor value, the optical transmission node 10 may control the level of light transmitted to the optical reception node 30, for example, for each of the X polarization component and the Y polarization component. For example, the optical transmission node 10 may control the polarization level of the transmission light such that a difference of the power level between the X polarization component and the Y polarization component of the transmission light is reduced.

Figure 11:
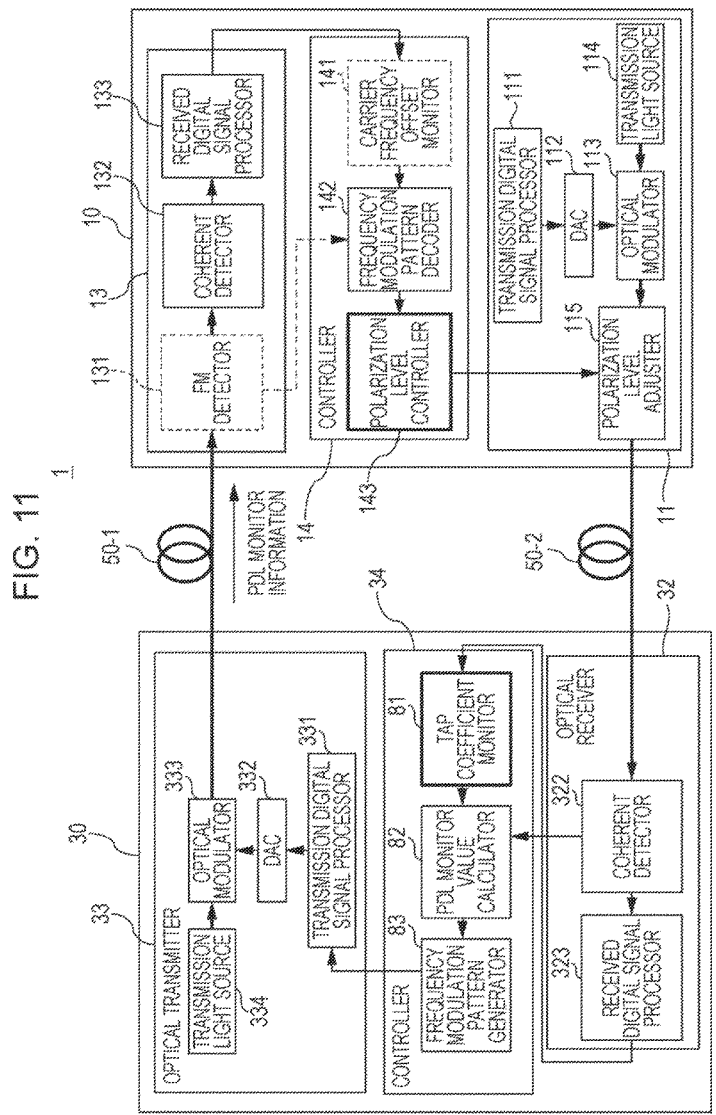
FIG. 11 is a block diagram illustrating a configuration example of an optical transmission system according to a second embodiment.

FIG. 11 illustrate a configuration example of an optical transmission system according to a second embodiment, which is configured to notify the PDL monitor value and perform the polarization level control based on the notified PDL monitor value. The optical transmission system 1 illustrated in FIG. 11 comprises, by way of example, a PDL monitor node 30 and a polarization level control node 10.

The PDL monitor node 30 is a node capable of determining the PDL monitor value as described above, and may correspond, by way of example, to the optical reception node 30. The polarization level control node 10 is a node capable of performing the polarization level control based on the PDL monitor value notified by the PDL monitor node 30, and may correspond to the optical transmission node 10.

The nodes 10 and 30 may be connected, by way of example, in a manner allowing a bidirectional optical communication using the optical transmission path 50-1 and the optical transmission path 50-2. By way of example, the optical transmission path 50-1 is used for optical communication from the PDL monitor node 30 to the polarization level control node 10, and the optical transmission path 50-2 is used for optical communication in the backward direction.

(PDL Monitor Node)

The PDL monitor node 30 may comprise, by way of example, an optical receiver 32, an optical transmitter 33, and a controller 34. The optical receiver 32 and the optical transmitter 33 may be included in one transponder.

The optical receiver 32 is configured to receive a signal light transmitted from the polarization level control node 10 to the optical transmission path 50-2. The optical receiver 32 may comprise the coherent detector 322 and the received digital signal processor 323.

The optical transmitter 33 is configured to transmit a transmission light for the polarization level control node 10 to the optical transmission path 50-1. The transmission wavelength of the optical transmitter 33 and the reception wavelength of the optical receiver 32 may be the same wavelength or different wavelengths.

The optical transmitter 33 may have the same configuration as the optical transmitter 11 of the polarization level control node 10, and may comprise, by way of example, a transmission digital signal processor 331, a digital-to-analog converter (DAC) 332, an optical modulator 333, and a transmission light source 334.

A semiconductor LD may be applied to the transmission light source 334. The semiconductor LD may be a LD having a fixed emission wavelength, or may be a tunable LD having a variable emission wavelength.

The transmission digital signal processor 331 performs digital signal processing of the transmission digital data signal, such as spectrum shaping, carrier frequency control, and nonlinear compensation.

The DAC 332 converts the transmission digital data signal subjected to the digital signal processing by the transmission digital signal processor 331 to the analog data signal. The analog data signal obtained by the DAC 332 is given to the optical modulator 333 as a drive signal of the optical modulator 333.

The optical modulator 333 generates a transmission modulation signal light by modulating output light of the transmission light source 334 with the drive signal given by the DAC 332. The transmission modulation signal light is transmitted to the optical transmission path 50-1 communicating with the polarization level control node 10.

Since frequency control according to the monitor control information is performed in the carrier frequency control by the transmission digital signal processor 331, the monitor control information may be superimposed on the transmission modulation signal light as a frequency modulation component.

The controller 34 controls the entire operation of the PDL monitor node 30. The controller 34 may comprise the tap coefficient monitor 81 and the PDL monitor value calculator 82. Therefore, the controller 34 may be alternatively referred to as "PDL monitor 34". The controller 34 may comprise a frequency modulation pattern generator 83.

As described above, the tap coefficient monitor 81 monitors the tap coefficient of the AEQ filter 74 in the received digital signal processor 323.

As described above, the PDL monitor value calculator 82 determines a corrected tap coefficient by canceling the gain value component from the monitored tap coefficient and calculates the PDL monitor value based on the correction tap efficient.

The frequency modulation pattern generator 83 incorporates information indicating a PDL monitor value obtained by the PDL monitor value calculator 82 (hereinafter, may be referred to as "PDL monitor information"), for example, into a pattern of frequency modulation represented by the binary of "1" or "0".

The pattern of frequency modulation (hereinafter may be referred to as "frequency modulation pattern") is given to the transmission digital signal processor 331 of the optical transmitter 33. The transmission digital signal processor 331 performs frequency modulation of the transmission digital data signal in accordance with the frequency modulation pattern.

Thus, the PDL monitor information is superimposed, as an example of the monitor control information, on the transmission modulation signal light for the polarization level control node 10 as a frequency modulation component. Therefore, the optical transmitter 33 may be considered as an example of the transmitter which transmits information indicating the PDL monitor value calculated by the PDL monitor value calculator 82 to the polarization level control node 10.

Superimposing of the PDL monitor information may be performed, by way of example, by controlling the carrier frequency of a signal subjected to the spectrum shaping by digital signal processing of the transmission digital data signal in the transmission digital signal processor 331.

Information to be superimposed on the transmission modulation signal light for the polarization level control node 10 may be polarization level control information obtained based on the PDL monitor information, instead of the PDL monitor information.

In other words, information to be superimposed on the transmission modulation signal light for the polarization level control node 10 in the PDL monitor node 30 may be information which is capable of controlling the polarization level of light which the polarization level control node 10 transmits to the PDL monitor node 30. Further, in other words, control information of the polarization level used by the polarization level control node 10 may be determined by the polarization level control node 10 or may be determined by the PDL monitor node 30.

From a different view point, the controller 34 of the PDL monitor node 30 has only to be capable of controlling polarization level of the transmission light of the polarization level control node 10 for each of polarization components based on the PDL monitor value obtained by the PDL monitor value calculator 82 by using the monitoring control communication.

(Polarization Level Control Node)

Meanwhile, the polarization level control node 10 may comprise, by way of example, an optical transmitter 11, an optical receiver 13, and a controller 14. The optical receiver 11 and the optical transmitter 13 may be included in one transponder.

The optical receiver 13 may comprise, by way of example, the coherent detector 132 and the received digital signal processor 133. Each of the coherent detector 132 and the received digital signal processor 133 may have a configuration identical or similar to the configuration of the coherent detector 322 and the reception digital signal processor 323 in the optical receiver 32 of the PDL monitor node 30.

Optionally, the optical receiver 13 may a frequency modulation (FM) detector 131, for example, in the fore stage of the coherent detector 132.

The FM detector 131 is configured to receive a signal light on which PDL monitor information is superimposed by frequency modulation in the optical transmitter 33 of the PDL monitor node 30 as described above and perform FM detection of the superimposed signal. The detection signal is, by way of example, given to the controller 14 (frequency modulation pattern decoder 142 described below).

When focused on reception of the PDL monitor information transmitted from the optical transmitter 33 of the PDL monitor node 30, the optical receiver 13 is one example of the receiver which receives information indicating the PDL monitor value calculated by the PDL monitor value calculator 82.

Next, as illustrated in FIG. 11, the optical transmitter 11 of the polarization level control node 10 may comprise, by way of example, a transmission digital signal processor 111, a DAC 112, an optical modulator 113, a transmission light source (for example, LD) 114, and a polarization level adjuster 115.

The transmission digital signal processor 111, the DAC 112, and the optical modulator 113 may be identical or similar to the transmission digital signal processor 331, the DAC 322, and the optical modulator 333 in the PDL monitor node 30, respectively.

For example, the transmission digital signal processor 111 performs digital signal processing of the transmission digital data signal, such as waveform (spectrum) shaping, carrier frequency control, and nonlinear compensation.

The DAC 112 converts the transmission digital data signal subjected to the digital signal processing by the transmission digital signal processor 111 to the analog data signal. The analog data signal obtained by the DAC 112 is given to the optical modulator 113 as a drive signal of the optical modulator 113.

The optical modulator 113 generates a transmission modulation signal light by modulating output light of the transmission light source 114 with the drive signal given by the DAC 112. The transmission modulation signal light is transmitted to the optical transmission path 50-2 communicating with the polarization monitor node 30. Like the transmission light source 334 of the optical transmitter 33 in the PDL monitor node 30, the transmission light source 114 may also be a light source (LD) having a fixed or variable emission wavelength.

By way of example, the polarization level adjuster 115 is capable of adjusting the power level of output light of the optical modulator 113 according to the control from the polarization level controller 143 separately for each of the X polarization component and the Y polarization component.

Figure 12:
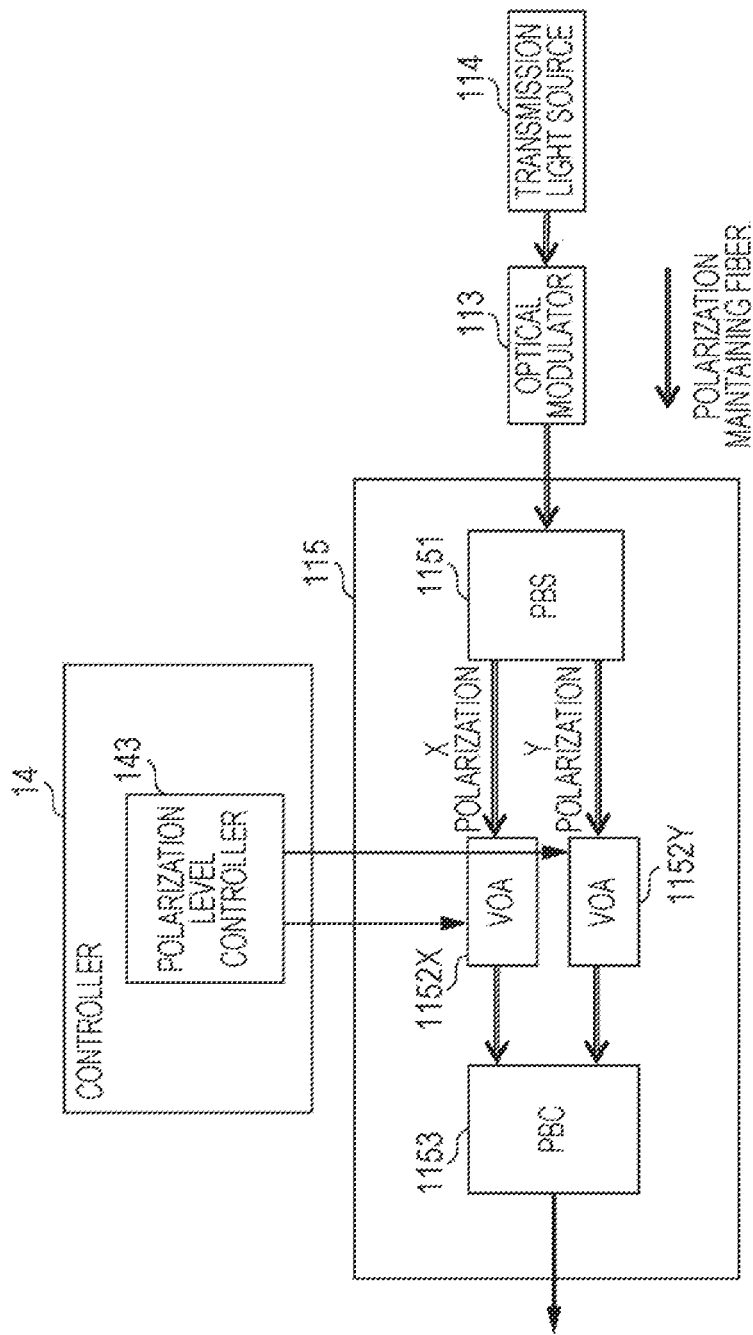
FIG. 12 is a block diagram illustrating a configuration example of a polarization level adjuster illustrated in FIG. 11.

For example, as illustrated in FIG. 12, the polarization level adjuster 115 may comprise a polarization beam splitter (PBS) 1151, variable optical attenuators (VOA) 1152X and 1152Y, and a polarization beam combiner (PBC) 1153.

Coupling between the transmission light source 114 and the optical modulator 13, and coupling between the optical modulator 113 and the PBS 1151 may be made via the polarization maintaining fiber. Also, coupling between the PBS 1151 and each of the VOAs 1152X and 1152Y, and coupling between and the PBC 1153 and each of the VOAs 1152X and 1152Y may be made via the polarization maintaining fiber.

The PBS 1151 is capable of separating output light of the optical modulator 113 into the X polarization component and the Y polarization component. The separated X polarization component is inputted, for example, into the VOA 1152X, and the separated Y component is inputted, for example, into the VOA 1152Y.

Both VOAs 1152X and 1152Y are capable of controlling the output light power level of the polarization component inputted from the PBS 1151 by each of the optical losses (or may be referred to as "VOA losses") being separately varied, for example, by the polarization level controller 143.

The PBC 1153 is capable of performing polarization synthesizing of lights of the polarization components whose output optical power levels are adjusted by the VOAs 1152X and 1152Y. The light polarization-synthesized by the PBC 1153 is transmitted to the optical transmission path 50-2 communicating with the PDL monitor node 30.

Although omitted in FIG. 11, also in the optical transmitter 11 of the polarization level control node 10, monitor control information may be superimposed on the transmission modulation signal light as a frequency modulation component by the transmission digital signal processor 111, similarly with the optical transmitter 33 of the PDL monitor node 30.

Next, the controller 14 of the polarization level control node 10 illustrated in FIG. 11 may comprise, by way of example, a frequency modulation pattern decoder 142 and a polarization level controller 143.

The frequency modulation pattern decoder 142 is configured to decode the frequency modulation pattern superimposed on the signal light received by the optical receiver 13. If the optical receiver 13 comprises the FM detector 131 as described above, the frequency modulation pattern decoder 142 may decode the frequency modulation pattern from the FM detection signal.

If the optical receiver 13 is not provided with the FM detector 131, the controller 14 may be provided with a carrier frequency offset monitor 141.

The carrier frequency offset monitor 141 performs a processing corresponding to FM detection for the received digital data signal subjected to digital signal processing by the received digital signal processor 133 and thereby obtains a signal corresponding to a detection signal obtained by the FM detector 131.

For example, the FM detection signal may be obtained in the step of estimating the frequency offset by the frequency offset compensator 75 (see FIG. 3) provided in the received digital signal processor 133.

In this case, the frequency modulation pattern decoder 142 decodes a frequency modulation pattern represented by the binary of "1" or "0" from the FM detection signal obtained by the carrier frequency offset monitor 141.

The polarization level controller 143 controls the polarization level adjuster 115 based on the PDL monitor information indicated by the frequency modulation pattern decoded by the frequency modulation pattern decoder 142 and thereby controls power levels of the X polarization component and the Y polarization component of the transmission light of the optical transmitter 11.

By way of example, the polarization level controller 143 controls the VOA loss of VOAs 1152X and 1152Y in the polarization level adjuster 115 based on the PDL monitor information such that the power level difference between the X polarization component and the Y polarization component is reduced.

The PDL monitor function in the PDL monitor node 30 also may be provided in the polarization level control node 10. Similarly, the polarization level control function in the polarization level control node 10 also may be provided in the PDL monitor node 30. In other words, the nodes 10 and 30 may be provided with the function of the PDL monitor node 30 and the function of the polarization level control node 10, respectively.

(Exemplary Operation)

Hereinafter, exemplary operations of the optical transmission system 1 according to the second embodiment illustrated in FIGS. 11 and 12 are described with reference to a flowchart illustrated in FIG. 13.

Figure 13:
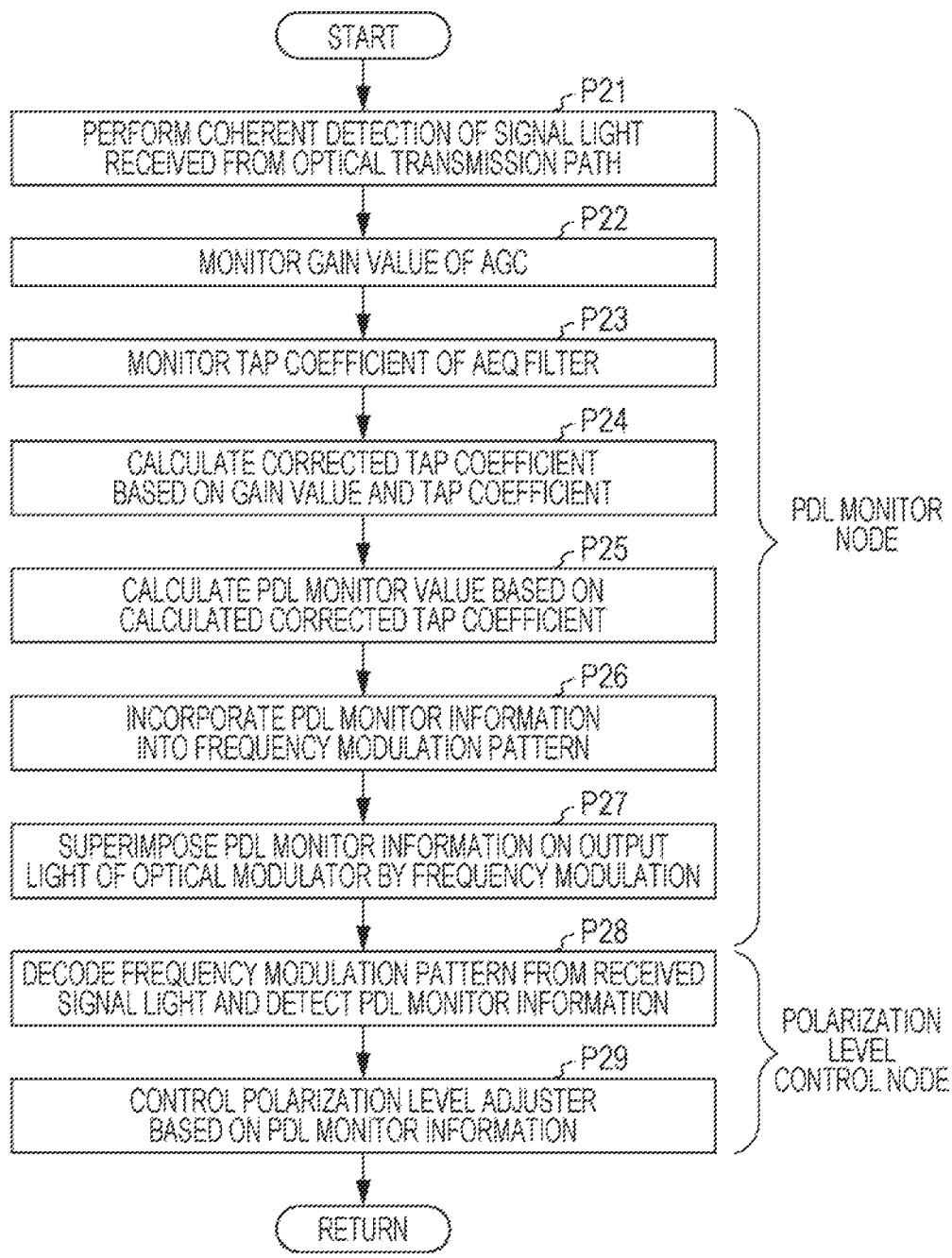
FIG. 13 is a flowchart illustrating an exemplary operation of the optical transmission system illustrated in FIGS. 11 and 12.

As illustrated in FIG. 13, for example, when the optical transmission system 1 is in operation, the signal light received from the optical transmission path 50-2 is subjected to coherent detection by the coherent detector 322 of the optical receiver 32 as described above (Operation P21).

The received signal light is converted to electric signals for four lanes by the coherent detector 322 and amplified by a corresponding electrical amplifier 63. The gain value used for the AGC during the amplification is monitored by the PDL monitor value calculator 82 of the controller 34 (Operation P22).

Electric signals for the four lanes amplified by the electrical amplifiers 63 subjected to the AGC are inputted into the received digital signal processor 323 for digital signal processing. In the step of the digital signal processing, the tap coefficients of the AEQ filter 74 are monitored by the tap coefficient monitor 81 of the controller 34 (Operation P23).

The monitored tap coefficients are inputted into the PDL monitor value calculator 82 of the controller 34. The PDL monitor value calculator 82 calculates the corrected tap coefficients based on the monitored gain values and the tap coefficients inputted from the tap coefficient monitor 81 as described above (Operation P24).

Then, the PDL monitor value calculator 82 calculates the PDL monitor value of the optical transmission path 50-2 based on the calculated corrected tap coefficients, as illustrated in Operation P14 to P18 in FIG. 7 (Operation P25).

Information indicating the calculated PDL monitor value is incorporated into the frequency modulation pattern represented by the binary of, for example, "1" or "0" by the frequency modulation pattern generator 83, and then inputted into the transmission digital signal processor 331 of the optical transmitter 33 (Operation P26).

The transmission digital signal processor 331 controls drive conditions of the optical modulator 333 in accordance with the frequency modulation pattern and thereby superimposes the PDL monitor information on the output light (for example, main signal light) of the optical modulator 333 as the frequency modulation component (Operation P27). Thus, the main signal light on which the PDL monitor information is superimposed by frequency modulation is transmitted to the polarization level control node 10 through the optical transmission path 50-1.

In the polarization level control node 10, the frequency modulation pattern superimposed on the main signal received from the optical transmission path 50-1 is decoded by the frequency modulation pattern decoder 142 of the controller 14 to detect the PDL monitor information (Operation P28).

The detected PDL monitor information is provided to the polarization level controller 143, and then, the polarization level controller 143 controls the polarization level adjuster 115 of the optical transmitter 11 based on the PDL monitor information (Operation P29).

For example, the polarization level controller 143 controls the VOA loss of the VOAs 1152X and 1152Y in the polarization level adjuster 115 based on the PDL monitor information such that the power level difference between the X polarization component and the Y polarization component is reduced.

Thus, the level difference between polarization components of the main signal light transmitted to the PDL monitor node 30 through the optical transmission path 50-2 decreases, and thereby PDL of the main signal light may be reduced.

Therefore, not only the same working effects as in the embodiment described above and the first embodiment may be obtained, but also, for example, transmission characteristics of the main signal light transmitted in the optical transmission path 50-2 may be improved, and consequently, transmission capacity and transmission distance of the main signal light may be increased.

Similarly, transmission characteristics of the main signal light may be improved also for a main signal light transmitted in the backward direction through the optical transmission path 50-1.

In the second embodiment described above, superimposing on the main signal light by frequency modulation is used for notification of the PDL monitor information to an opposite station. However, the method of notifying the PDL monitor information to the opposite station is not limited to superimposing on the main signal light by frequency modulation. For example, any communication path (or may be referred to as "path" or "channel") may be used for notification of the PDL monitor information, provided that the communication path is capable of communicating with the polarization level control node 10.

For example, the PDL monitor information may be mapped on the overhead (OH) of the main signal light destined for the opposite station. However, when the OH of the main signal light is used for transmission of the PDL monitor information, communication of the OH is disabled when the main signal light is turned off.

Thus, a communication path different from a communication path of the main signal light may be used for notification of the PDL monitor information. The communication path may be a communication path common to the PDL monitor information and other information, or a communication path individually prepared and established for notification of the PDL monitor information.

As information amount of the PDL monitor information may be considered less than the main signal, communication rate may be lower than the main signal, and therefore a communication path having a stronger resistance against the load than the main signal light may be used for notification of the PDL monitor information.

Third Embodiment

The PDL monitor function illustrated in the above embodiment, the first embodiment and the second embodiment may be applied not only to a terminal station but also to an optical relay station (optical relay node) such as the ROADM and inline amplifier (ILA). Similarly with the optical transmission node 10 and the optical reception node 30, the optical relay node is one example of "optical transmission apparatus". "Optical relay node" may be alternatively referred to as "relay" or "repeater".

Figure 14:
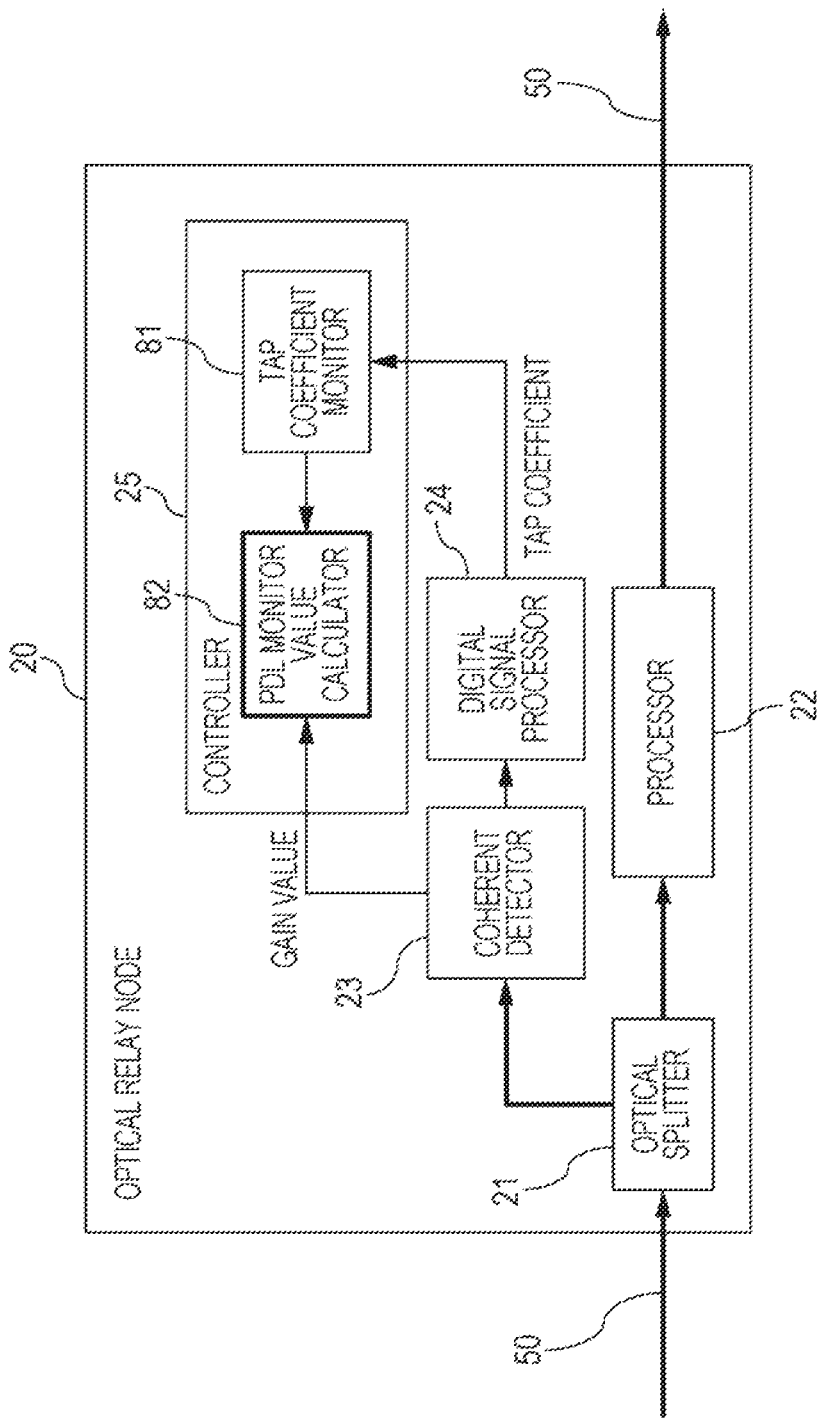
FIG. 14 is a block diagram illustrating a configuration example of a node according to a third embodiment.

FIG. 14 illustrates a configuration example of an optical relay node according to a third embodiment. An optical relay node 20 illustrated in FIG. 14 may comprise, by way of example, an optical splitter 21, a processor 22, a coherent detector 23, a digital signal processor 24, and a controller 25.

The optical splitter 21 branches the light received from the optical transmission path 50. One of the branched received lights is inputted into the coherent detector 23, and the other of the branched received lights is inputted into the processor 22.

The processor 22 performs a processing different from the PDL monitor for the received light inputted from the optical splitter 21. The "different processing" may include a processing related to relaying of the received light. For example, since optical level of the light received from the upstream optical transmission path 50 is decreased due to the optical loss of the transmission path 50, the optical level may be increased by the optical amplification function of the processor 22 before transmitting the light to the downstream optical transmission path 50.

The coherent detector 23 performs coherent detection of the received light inputted from the optical splitter 21. The coherent detector 23 may have a configuration identical or similar to the coherent detector 322 (for example, see FIGS. 2 and 3).

The digital signal processor 24 performs digital signal processing of an electric signal obtained in the coherent detection by the coherent detector 23. The digital signal processor 24 may have a configuration identical or similar to the digital signal processor 323 (for example, see FIGS. 3, 4, and 6).

The controller 25 controls the entire operation of the optical relay node 20. The controller 25 may comprise the tap coefficient monitor 81 and the PDL monitor value calculator 82. Therefore, the controller 25 may be alternatively referred to as "PDL monitor 25".

The tap coefficient monitor 81 monitors, by way of example, the tap coefficient of the AEQ filter 74 in the digital signal processor 24.

The PDL monitor value calculator 82 monitors, by way of example, the gain value of the electrical amplifier 62 subjected to the AGC in the coherent detector 23. Then, the PDL monitor value calculator 82 calculates the corrected tap coefficient based on the tap coefficient monitored by the tap coefficient monitor 81 and the gain value of the coherent detector 23 as described above, and then calculates the PDL monitor value based on the calculated corrected tap coefficient.

Similarly with the first embodiment, the calculated PDL monitor value may be used for alarm detection or may be stored in the storage device 93 as an operation log. In other words, the third embodiment may be combined with the first embodiment. By combining with the first embodiment, working effects similar to the first embodiment also may be obtained in the third embodiment.

Further, the third embodiment may be combined with the second embodiment. For example, one or more optical relay nodes 20 having the configuration illustrated in FIG. 14 may be provided between the nodes 10 and 30 of the optical transmission system 1 illustrated in FIG. 11.

FIG. 15 illustrates a configuration example of an optical transmission system 1 comprising multiple nodes #1 to #n (n is an integer equal to or larger than 2). By way of example, a node #j and a node #(j+1) (j is one of 1 to n) may be coupled via an optical transmission path 50. Optical communication through the optical transmission path 50 may be unidirectional or bidirectional.

The node #1 may correspond, by way of example, to a terminal station which transmits (or receives) the signal light. The node #1 as a transmission terminal station may correspond, by way of example, to an optical transmission node 10 having the configuration illustrated in FIGS. 1 and 11.

The node #n may correspond, by way of example, to a terminal which receives (or transmits) the signal light. The node #n as a reception terminal station may correspond, by way of example, to an optical reception node 30 having the configuration illustrated in FIGS. 1 and 11.

The node #2 to node #(n−1) may correspond, by way of example, to an optical relay node 20 having the configuration illustrated in FIG. 14.

By way of example, each node #j may comprise the PDL monitor function, and may be coupled to an operation system (OPS) 40 in a manner allowing mutual communication to each other. Communication between the node #j and the OPS 40 may be referred to as "control communication" for the sake of convenience.

Based on the signal light received from the optical transmission path 50, each node #j may transmit the PDL monitor value calculated by the PDL monitor function as above to the OPS 40 by utilizing the control communication.

The OPS 40 may check the PDL of the optical transmission path 50 for each transmission section (or may be referred to as "span") between the node #j and the node #(j+1) based on the PDL monitor value received from the node #j.

Therefore, a span giving a relatively significant impact on transmission characteristics caused by the PDL may be quickly identified, and thereby measures and actions for improving transmission characteristics of the identified span may be taken quickly. Consequently, transmission characteristics of the optical transmission system 1 as a whole may be improved quickly.

As described above, according to the embodiment including the above examples, PDL monitor accuracy of the optical transmission path may be improved, and thereby precise state of the optical transmission path may be grasped. The accurate PLD monitoring also makes it possible to take controls and measures for improving optical transmission characteristics more easily based on the accurate PLD monitoring result. Therefore, transmission capacity and transmission distance of the signal light in the optical transmission system 1 may be increased according to the improvement effect of the optical transmission characteristics.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission apparatus comprising:
    a coherent detector configured to receive light including different polarization components from an optical transmission path, and perform coherent detection of received light including the different polarization components;
    an adaptive equalizer configured to adaptively equalize, by a digital filter, a complex electric signal for each of the polarization components obtained by the coherent detection, a gain value for controlling an amplitude of the complex electric signal being applied to the complex electric signal; and
    a polarization dependent loss monitor configured to determine a polarization dependent loss of the optical transmission path, based on a correction filter parameter obtained by correcting a filter parameter of the digital filter according to the gain value, the filter parameter being adaptively updated by an adaptive equalization of the adaptive equalizer,
    wherein the polarization dependent loss monitor includes
        a filter parameter monitor configured to monitor the filter parameter of the digital filter, and
        a polarization dependent loss calculator configured to calculate the correction filter parameter by an arithmetic operation of removing a component corresponding to the gain value from the filter parameter monitored by the filter parameter monitor, and calculate the polarization dependent loss based on the correction filter parameter calculated by the arithmetic operation.

2. The optical transmission apparatus according to claim 1,
    wherein the amplitude of the complex electric signal is controlled by the gain value such that amplitudes of complex electric signals of the polarization components are equal to each other.

3. The optical transmission apparatus according to claim 1, further comprising:
    an alarm detector configured to detect an alarm related to a transmission characteristic of the received light based on the polarization dependent loss obtained by the polarization dependent loss monitor.

4. The optical transmission apparatus according to claim 1, further comprising:
    a storage device configured to store the polarization dependent loss obtained by the polarization dependent loss monitor as a log.

5. The optical transmission apparatus according to claim 1, further comprising:
    a transmitter configured to transmit information indicating the polarization dependent loss obtained by the polarization dependent loss monitor to another optical transmission apparatus to transmit the received light to the optical transmission path, and
    wherein the information indicating the polarization dependent loss is used by the other optical transmission apparatus for control to reduce a power level difference between the polarization components of a light to be transmitted to the optical transmission path.

6. An optical transmission system comprising:
    a first optical transmission apparatus including
    a first receiver configured to receive information,
    a polarization level controller configured to control power level of light to be transmit, and
    a first transmitter configured to transmit the light; and
    a second optical transmission apparatus coupled with the first optical transmission apparatus via an optical transmission path, the second transmission apparatus including
    a second receiver configured to receive light including different polarization components from the first optical transmission path, a coherent detector configured to perform coherent detection of received light including different polarization components, an adaptive equalizer configured to adaptively equalize, by a digital filter, a complex electric signal for each of the polarization components obtained by the coherent detection, a gain value for controlling an amplitude of the complex electric signal being applied to the complex electric signal, a polarization dependent loss monitor configured to determine a polarization dependent loss of the optical transmission path, based on a correction filter parameter obtained by correcting a filter parameter of the digital filter according to the gain value, the filter parameter being adaptively updated by an adaptive equalization of the adaptive equalizer, and a second transmitter configured to transmit information indicating the polarization dependent loss determined by the polarization dependent loss monitor to the first optical transmission apparatus, wherein the first receiver receives the information indicating the polarization dependent loss transmitted from the second optical transmission apparatus, the polarization level controller controls power level of the light to be transmitted for each of the polarization components, based on the information indicating the polarization dependent loss received by the first receiver so as to reduce a power level difference between the polarization components of the light, the first transmitter transmits the light including the different polarization components to the optical transmission path linked to the second optical transmission apparatus, and the polarization dependent loss monitor includes a filter parameter monitor configured to monitor the filter parameter of the digital filter, and a polarization dependent loss calculator configured to calculate the correction filter parameter by an arithmetic operation of removing a component corresponding to the gain value from the filter parameter monitored by the filter parameter monitor, and calculate the polarization dependent loss based on the correction filter parameter calculated by the arithmetic operation.

7. The optical transmission system according to claim 6, wherein the second transmitter superimposes, as a frequency modulation component, information indicating the polarization dependent loss on light to be transmitted to the first optical transmission apparatus, and wherein the first receiver detects frequency of the light on which the frequency modulation component is superimposed, and detects the information indicating the polarization dependent loss.

8. A polarization dependent loss monitor comprising:

a filter parameter monitor configured to monitor a filter parameter of a digital filter configured to adaptively equalize a complex electric signal for each polarization component obtained by coherent detection of a received light including different polarization components from an optical transmission path; and a polarization dependent loss calculator configured to correct the filter parameter monitored by the filter parameter monitor according to a gain value applied to the complex electric signal for controlling an amplitude of the complex electric signal, and determine a polarization dependent loss of the optical transmission path based on the corrected filter parameter, wherein the polarization dependent loss calculator is further configured to correct the filter parameter monitored by the filter parameter monitor by an arithmetic operation of removing a component corresponding to the gain value from the filter parameter monitored by the filter parameter monitor, and determine the polarization dependent loss based on the correction filter parameter corrected by the arithmetic operation.

\* \* \* \* \*